(12) United States Patent
Sommer et al.

(10) Patent No.: US 10,546,198 B2
(45) Date of Patent: Jan. 28, 2020

(54) METHOD FOR THE COMPUTER-AIDED RECOGNITION OF A TRANSPORT CONTAINER BEING EMPTY AND DEVICE FOR THE COMPUTER-AIDED RECOGNITION OF A TRANSPORT CONTAINER BEING EMPTY

(71) Applicant: Wincor Nixdorf International GmbH, Paderborn (DE)

(72) Inventors: Martin Sommer, Berlin (DE); Daniel Kieneck, Berlin (DE); Oliver Schaefer, Berlin (DE)

(73) Assignee: Wincor Nixdorf International, GmbH, Paderborn (DE)

( * ) Notice: Subject to any disclaimer, the term of this patent is extended or adjusted under 35 U.S.C. 154(b) by 77 days.

(21) Appl. No.: 15/434,146

(22) Filed: Feb. 16, 2017

(65) Prior Publication Data
US 2017/0243068 A1 Aug. 24, 2017

(30) Foreign Application Priority Data
Feb. 24, 2016 (EP) ..................................... 16157106

(51) Int. Cl.
*G06K 9/00* (2006.01)
*A47F 9/04* (2006.01)
*G06K 9/32* (2006.01)
*G06K 9/46* (2006.01)
*G06K 9/62* (2006.01)
*G06Q 20/20* (2012.01)

(52) U.S. Cl.
CPC .......... *G06K 9/00771* (2013.01); *A47F 9/045* (2013.01); *G06K 9/3233* (2013.01); *G06K 9/4604* (2013.01); *G06K 9/4652* (2013.01); *G06K 9/6215* (2013.01); *G06Q 20/204* (2013.01); *G06Q 20/209* (2013.01)

(58) Field of Classification Search
None
See application file for complete search history.

(56) References Cited

U.S. PATENT DOCUMENTS

| 2008/0226129 | A1  | 9/2008  | Kundu et al. |
| 2010/0158386 | A1* | 6/2010  | Smilansky ............... G01F 22/00 382/194 |
| 2013/0335557 | A1* | 12/2013 | Faber ........................ G01V 8/10 348/135 |
| 2014/0219508 | A1* | 8/2014  | Gunter ................ B60R 25/2045 382/104 |
| 2016/0210534 | A1* | 7/2016  | Padubrin .................. G06K 9/48 |

OTHER PUBLICATIONS

European Search Report based on application No. 16 157 106.2 (6 pages) dated Jul. 22, 2016 (Reference Purpose Only).

* cited by examiner

*Primary Examiner* — Wei Wen Yang
(74) *Attorney, Agent, or Firm* — Black, McCuskey, Soers & Arbaugh, LPA

(57) ABSTRACT

A method for computer-aided recognition of a transport container being empty is provided. The method includes capturing image data of a region of the transport container; determining a contour pattern, which represents the transport container, using the image data; determining a deviation variable, which represents a deviation of the contour pattern from at least one reference pattern, wherein the at least one reference pattern represents an empty transport container; and outputting a signal if the deviation variable satisfies a predefined criterion.

9 Claims, 31 Drawing Sheets

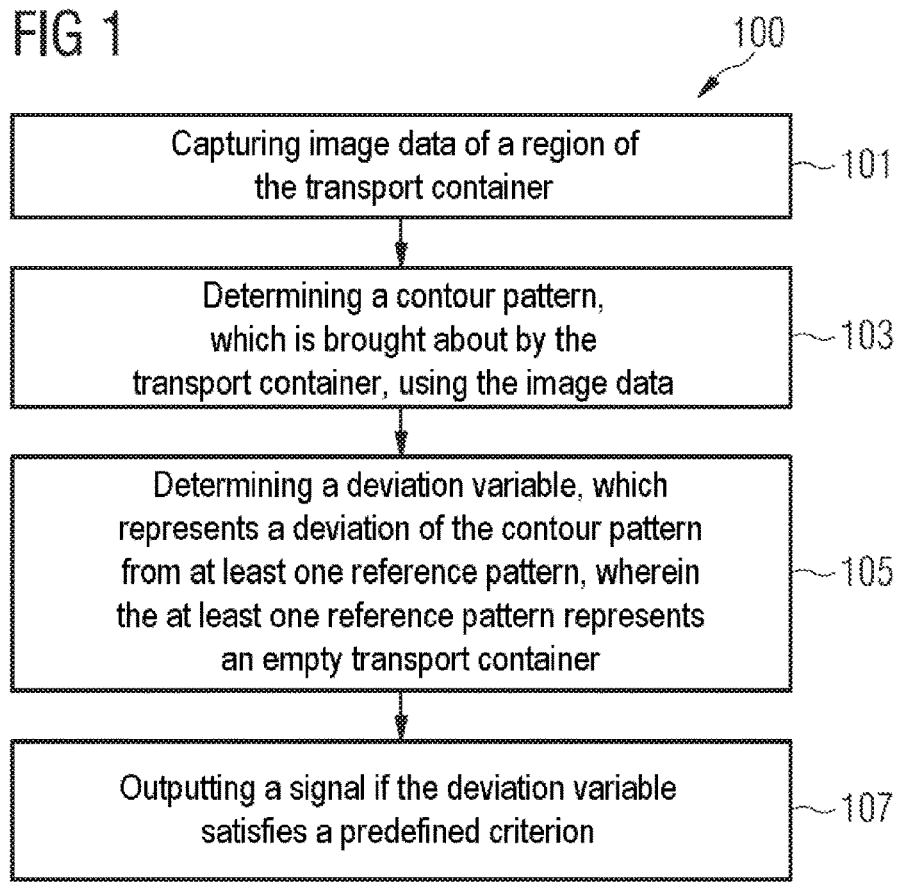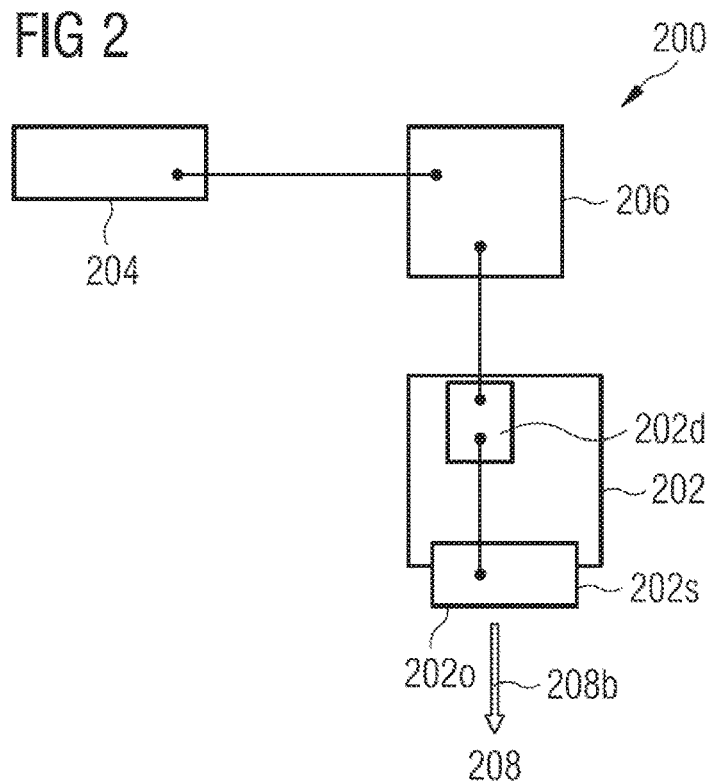

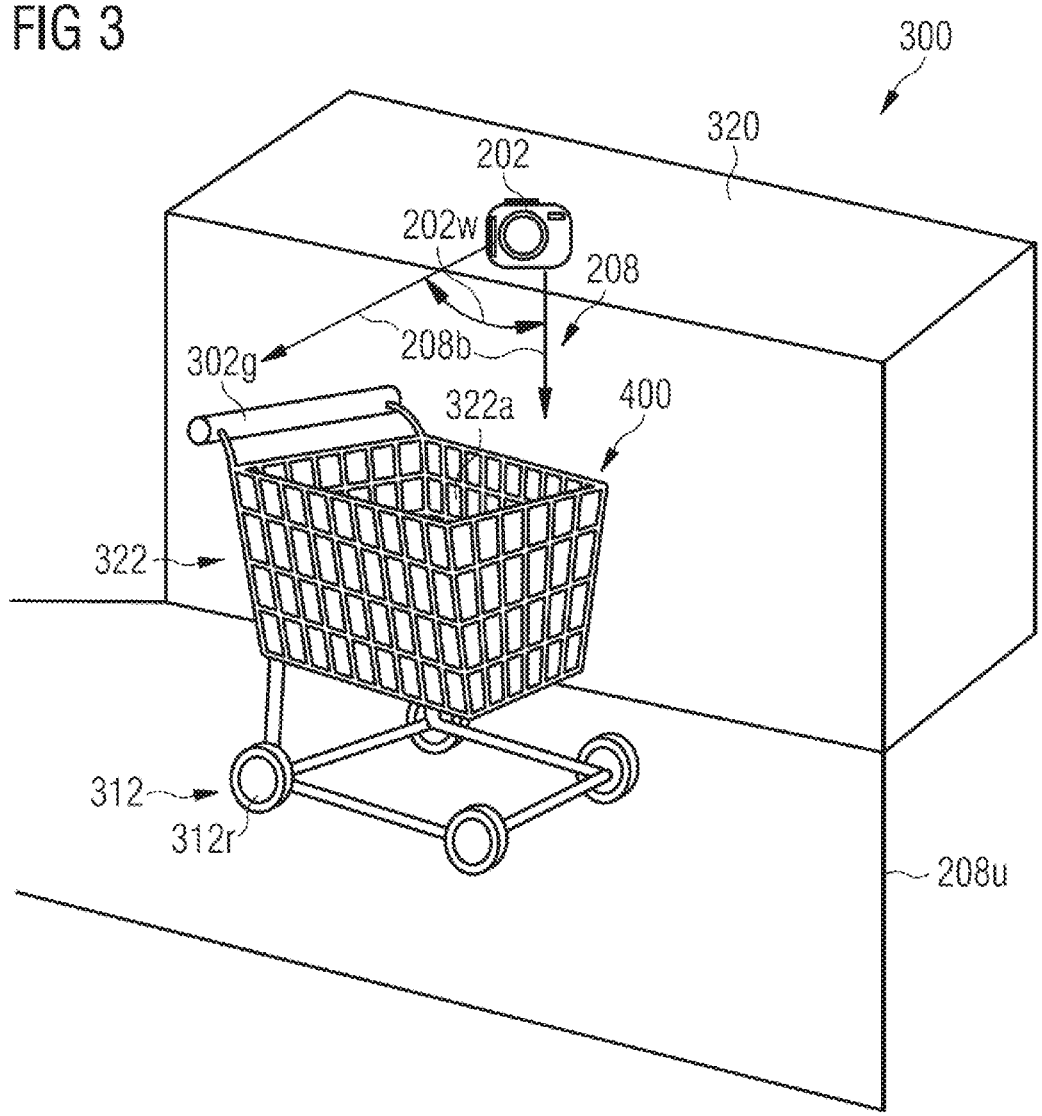

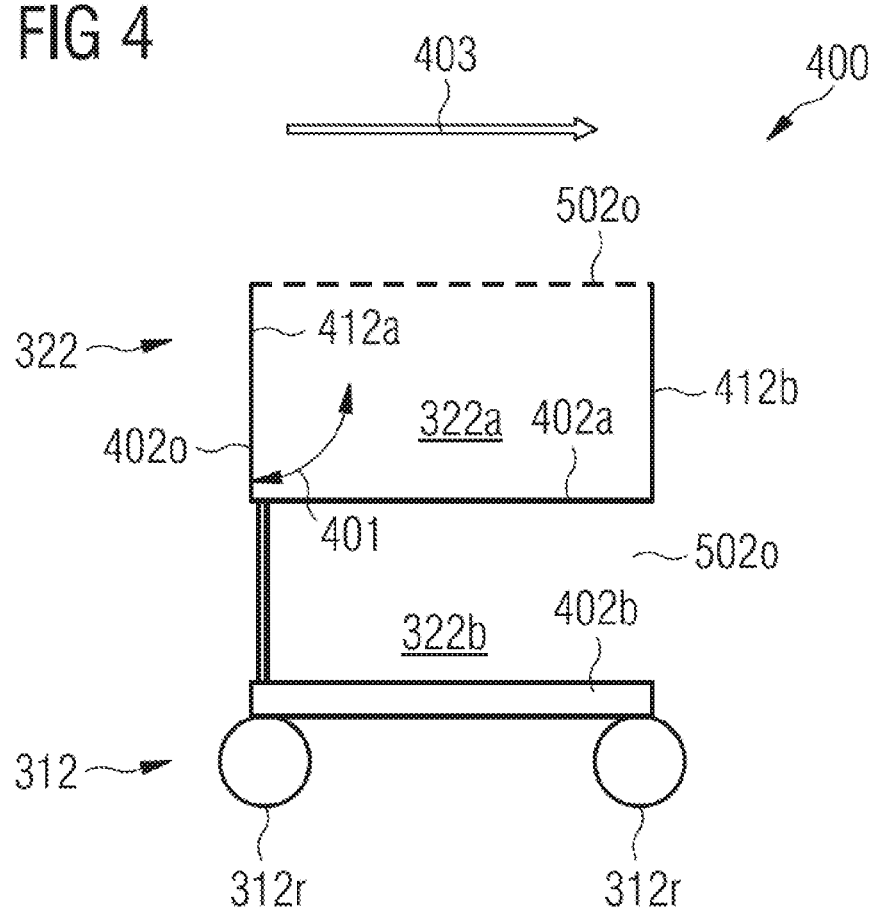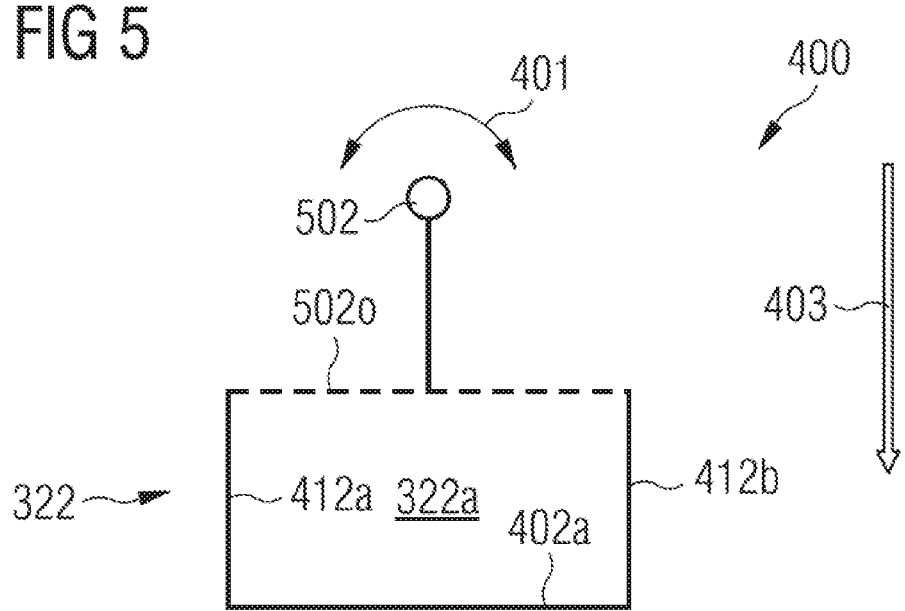

FIG 14
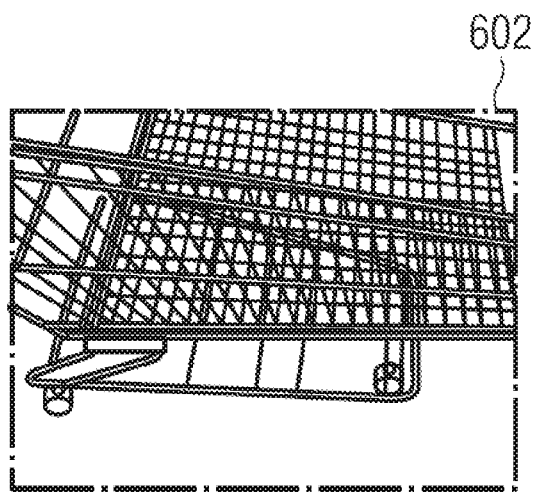
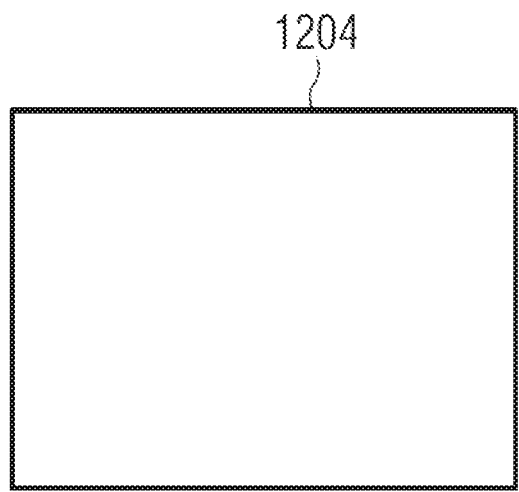
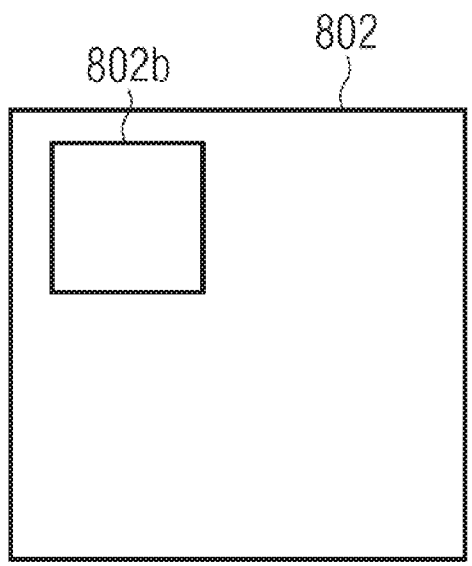
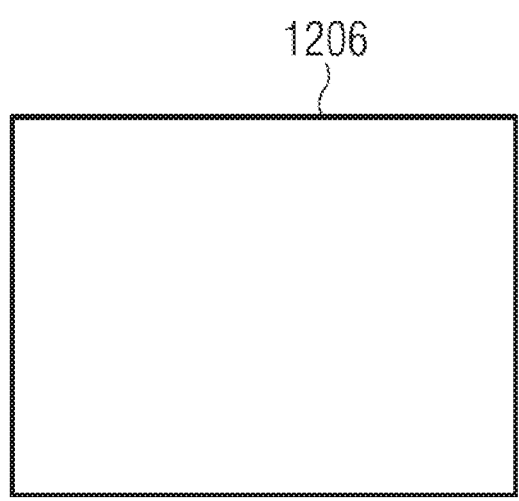

FIG 18
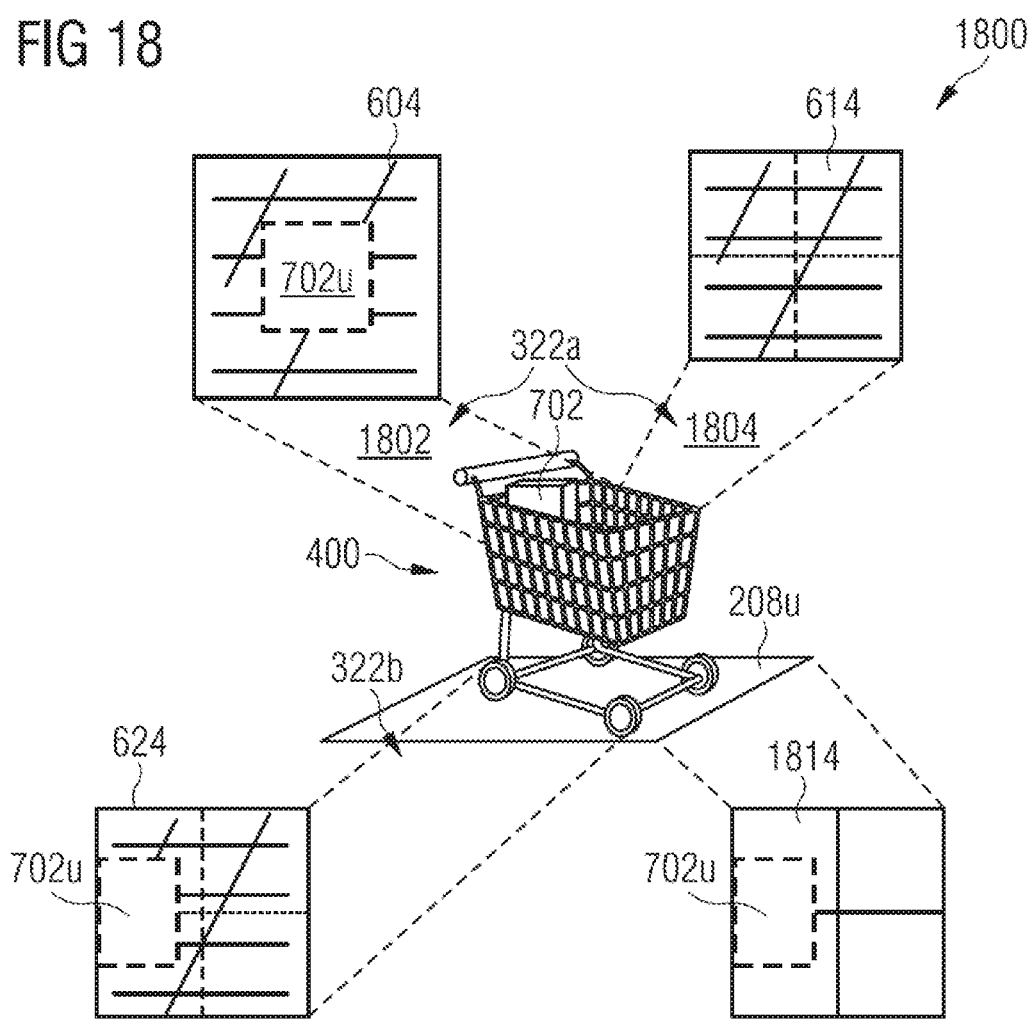
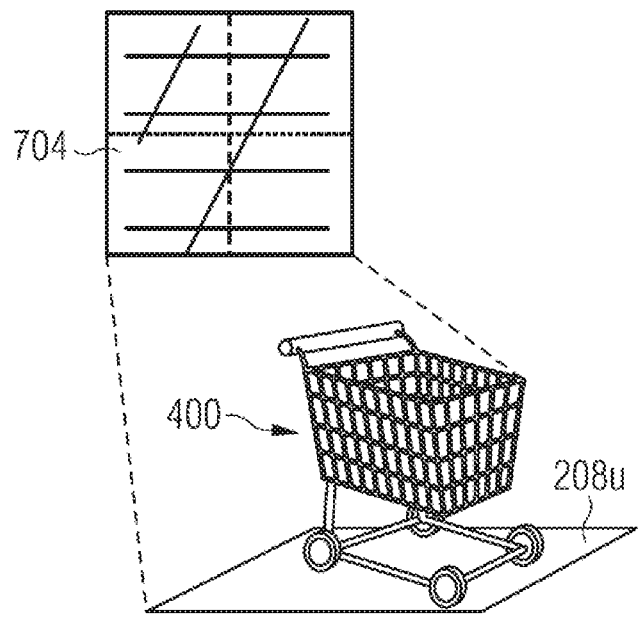

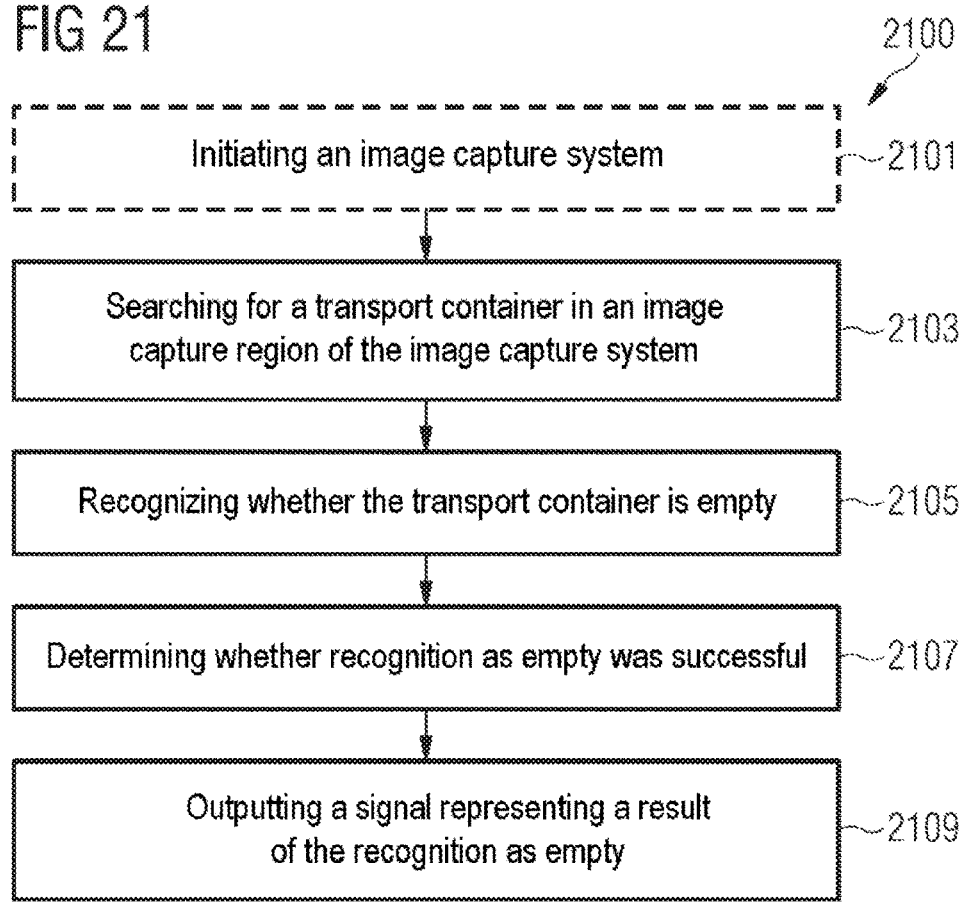
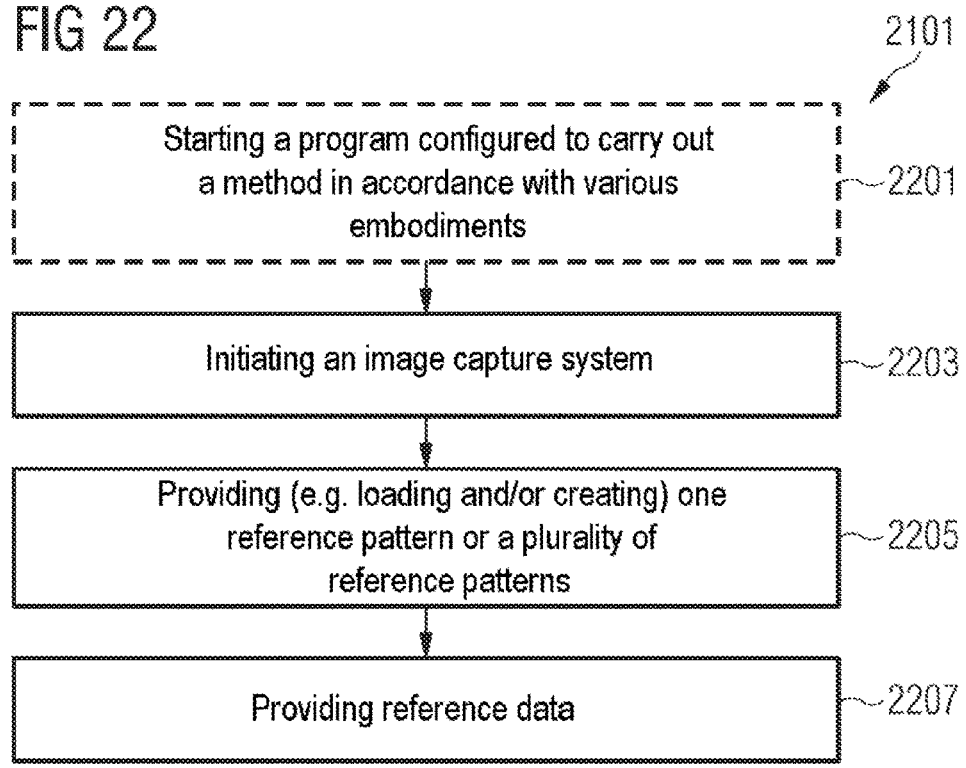

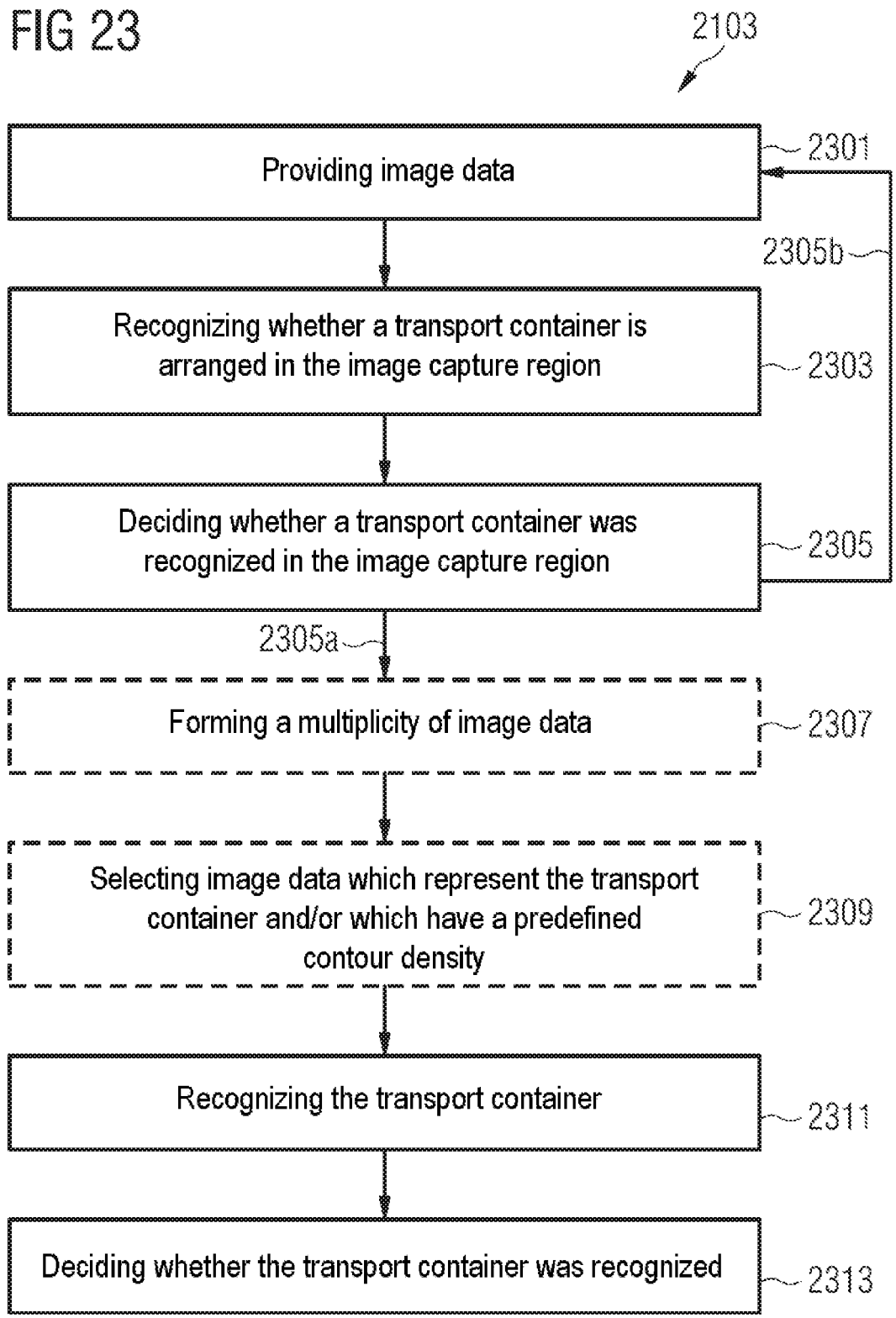

METHOD FOR THE COMPUTER-AIDED RECOGNITION OF A TRANSPORT CONTAINER BEING EMPTY AND DEVICE FOR THE COMPUTER-AIDED RECOGNITION OF A TRANSPORT CONTAINER BEING EMPTY

CROSS-REFERENCE TO RELATED APPLICATION

This application claims priority to European Patent Application Serial No. 16 157 106.2, which was filed Feb. 24, 2016, and is incorporated herein by reference in its entirety.

TECHNICAL FIELD

Various embodiments relate generally to a method for the computer-aided recognition of a transport container being empty and a device for the computer-aided recognition of a transport container being empty.

BACKGROUND

In general, transport containers can be used to transport objects, e.g. goods in the field of production or sales. In this case, it may be necessary to recognize whether something, and if appropriate what, is situated in the transport container, e.g. when registering goods at a checkout exit (this may also be referred to as "Bottom of Basket" recognition—BoB). It is thus possible to reduce costs which arise if unregistered goods pass through the checkout exit without being recognized (this may also be referred to as loss prevention).

Computer-aided methods of pattern recognition are conventionally used to identify objects arranged in the transport container. In this case, distinctive patterns of the objects are recognized and compared with a database in which the patterns of known objects, e.g. goods, are stored.

The comparison of the patterns of objects contained in the transport container with the database and the capacity of the database may require a considerable outlay, particularly if a large number of objects are stored in the database with their respective patterns and/or if objects similar to one another are intended to be recognized. By way of example, it may be necessary to store for each object in each case a data set in accordance with various views of the object, if, for example, it cannot be ensured that the object is always present in the same orientation. Objects that are similar to one another may require a larger number of features to be compared in order to enable a reliable identification.

As the capacity of the database increases, that is to say as the number of data sets increases and/or the number of entries per data set increases, the storage requirement needed and the required computing power or required data analysis speed may increase in order to ensure temporally effective recognition of the objects, e.g. in real time. Furthermore, as the capacity of the database increases, the outlay for maintaining the data sets (data maintenance requirement) and hence the required personnel may increase in order to prevent an uncontrolled growth in the capacity of the database owing to obsolete data sets. Therefore, these systems for computer-aided pattern recognition may engender a considerable cost expenditure in terms of procurement and/or in terms of maintenance, particularly if e.g. a respective system is required per checkout exit. Moreover, the pattern recognition process is very complex in the case of a very high number of objects to be differentiated and the susceptibility to errors in the pattern recognition likewise increases as the number of patterns that are similar to one another increases.

Furthermore, a conventional recognition of the content of a transport container may be limited and/or inaccurate, e.g. in the case of flat objects (which have a small cross section e.g. in one orientation); objects having little or no accentuation and/or colouration, e.g. having only low information, colour and/or texture content (for example a virtually homogenous layout such as black, white, grey, etc.); and/or transparent objects. Furthermore, objects not stored in the database are regularly not recognized or recognized incorrectly.

SUMMARY

A method for computer-aided recognition of a transport container being empty is provided. The method includes capturing image data of a region of the transport container; determining a contour pattern, which represents the transport container, using the image data; determining a deviation variable, which represents a deviation of the contour pattern from at least one reference pattern, wherein the at least one reference pattern represents an empty transport container; and outputting a signal if the deviation variable satisfies a predefined criterion.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 1 shows a method in accordance with various embodiments in a schematic flow diagram;

FIG. 2 shows a device in accordance with various embodiments in a schematic view;

FIG. 3 shows a device in accordance with various embodiments in a schematic perspective view;

FIG. 4 shows a transport container in accordance with various embodiments in a schematic side view or cross-sectional view;

FIG. 5 shows a transport container in accordance with various embodiments in a schematic side view or cross-sectional view;

FIG. 14 shows a method in accordance with various embodiments in a schematic view;

FIG. 18 shows a method in accordance with various embodiments in a schematic view;

FIGS. 21 to 37 respectively show a method in accordance with various embodiments in a schematic view.

DESCRIPTION

Figure 6:
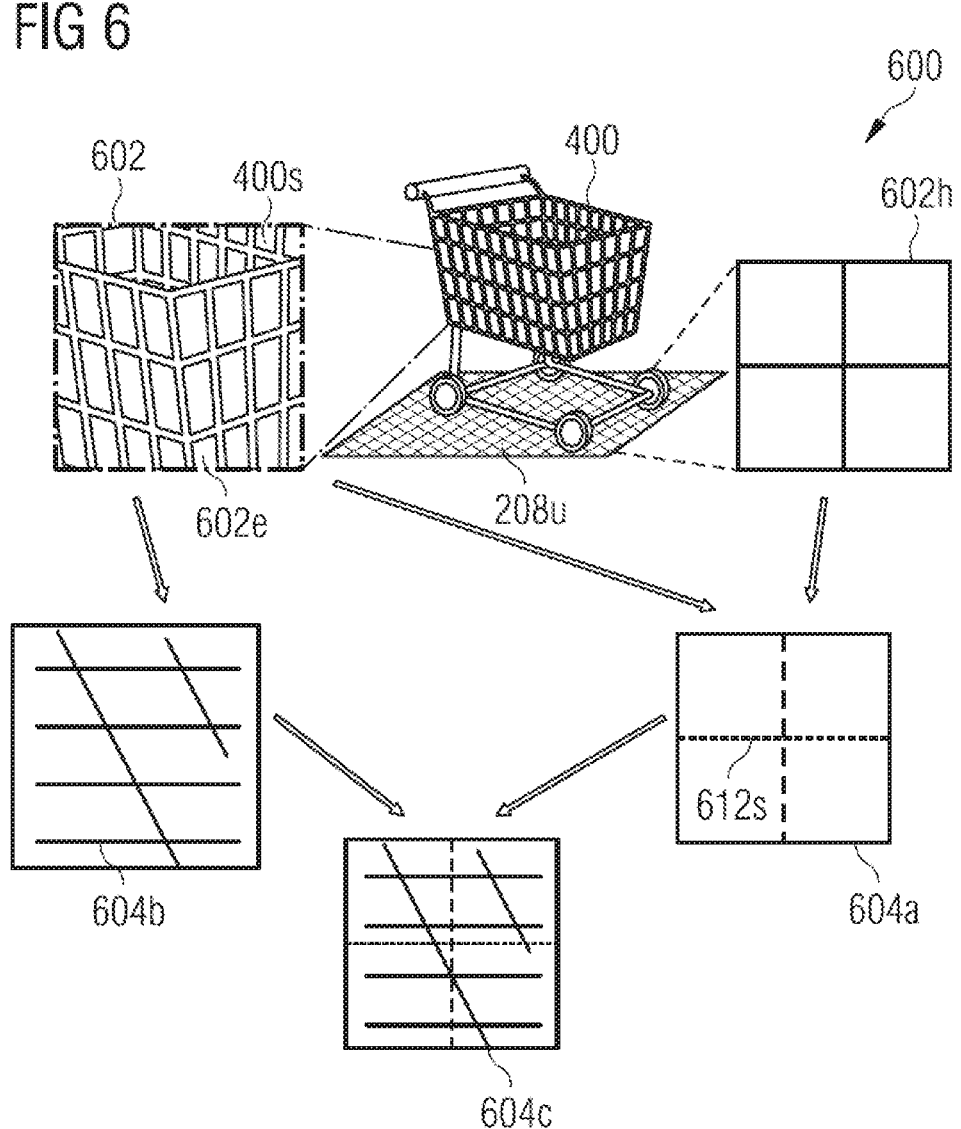
FIG. 6 shows a method in accordance with various embodiments in a schematic flow diagram.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

In the following detailed description, reference is made to the accompanying drawings, which form part of this description and show for illustration purposes specific embodiments in which the invention can be implemented. In this regard, direction terminology such as, for instance, "at the top", "at the bottom", "at the front", "at the back", "front", "rear", etc. is used with respect to the orientation of the figure(s) described. Since components of embodiments can be positioned in a number of different orientations, the direction terminology serves for illustration and is not restrictive in any way whatsoever. It goes without saying that other embodiments can be used and structural or logical changes can be made, without departing from the scope of protection of the present invention. It goes without saying that the features of the various exemplary embodiments described herein can be combined with one another, unless specifically indicated otherwise. Therefore, the following detailed description should not be interpreted in a restrictive sense, and the scope of protection of the present invention is defined by the appended claims.

In the context of this description, the terms "connected" and "coupled" are used to describe both a direct and an indirect connection and a direct or indirect coupling. In the figures, identical or similar elements are provided with identical reference signs, in so far as this is expedient.

In accordance with various embodiments, a method for the computer-aided recognition of a transport container being empty (i.e. illustratively for recognizing whether the transport container is empty, or, to put it another way, is free of objects contained in the transport container) and a device for the computer-aided recognition of the transport container being empty are provided which have a lower complexity, as a result of which the computational complexity and the storage outlay can be reduced. This makes it possible to use simpler equipment, such that the cost expenditure during procurement can be reduced. Furthermore, the capacity of the database can be reduced, such that the outlay for maintenance and for maintaining the data sets can be reduced, which can lead to a saving of costs.

Illustratively, in accordance with various embodiments, a method for the computer-aided recognition of a transport container being empty and a device for the computer-aided recognition of the transport container being empty are provided which determine pattern deviations of one or more patterns determined from one or more images—recorded by means of a camera, for example—of the transport container (possibly filled with one or more objects) from one or more stored patterns of the transport container in an empty state (i.e. without objects in the transport container).

The pattern deviations are brought about for example by objects in the transport container, that is to say that they arise or become greater if the transport container is not empty. Illustratively, a recorded image or a plurality of recorded images (more precisely features extracted from the image or images) of the transport container to be examined is or are compared with one or a plurality of reference transport container images (more precisely with reference transport container features which were extracted from one or a plurality of reference transport container images, for example in a preceding training method) of one or a plurality of reference transport containers which is/are empty, and on the basis of the pattern deviations a decision is taken as to whether or not the transport container to be examined is empty.

In accordance with various embodiments, it is no longer necessary to use a database in which every possible object to be recognized is stored, rather the capacity of the database can be reduced to the transport container(s) used. Consequently, the capacity of the database no longer increases with the number and/or variation of the objects which could be transported by means of the transport container and which are to be recognized.

In accordance with various embodiments, depth information is furthermore obtained by means of a three-dimensional (3D) image capture. The depth information can be used, for example, to recognize whether an object is situated in different regions of the transport container, e.g. on a lower and/or upper plane. It is thus possible to differentiate in what region of the transport container an object is situated. By way of example, the depth information can be obtained through one of the regions, such that illustratively it is possible to recognize from above whether something is situated in a lower region of the transport container or in a region below the transport container. The number of image capture sensors required can thus be reduced since the transport container can be completely examined from one and the same perspective.

In accordance with various embodiments, a system for the computer-aided analysis of objects (articles) in an (e.g. open) transport container (may also be referred to as transport medium) is provided. The system makes it possible to determine the state of the transport container (e.g. empty, or not empty) at a specific point in time and/or location, e.g. in an automated manner.

In accordance with various embodiments, a method for the computer-aided recognition of a transport container being empty may include the following: capturing image data of a region of the transport container; determining a contour pattern (e.g. by means of feature recognition), which represents the transport container (e.g. which is brought about by the transport container), using the image data; determining a deviation variable, which represents a deviation of the contour pattern from at least one reference pattern. The at least one reference pattern represents an empty transport container. The method may further include outputting a signal if the deviation variable satisfies a predefined criterion.

In accordance with various embodiments, the method may furthermore include: capturing (e.g. additional) image data of an additional region of the transport container; determining an additional contour pattern, which represents the additional region (e.g. which is brought about by the additional region), on the basis of the (e.g. additional) image data. A reference pattern of the at least one reference pattern includes the additional contour pattern.

In accordance with various embodiments, the method may furthermore include: storing the additional contour pattern on a data storage medium.

In accordance with various embodiments, the at least one reference pattern can be part of a database or form the latter.

In accordance with various embodiments, the at least one reference pattern or the database may include a plurality of reference patterns (e.g. two or more than two, e.g. three, four, five, six, seven, eight, nine, ten or more than ten, e.g. twenty, fifty, e.g. one hundred or more than one hundred).

In accordance with various embodiments, the method may furthermore include: reading out a reference pattern of the at least one reference pattern from a data storage medium (e.g. from the database).

In accordance with various embodiments, the transport container can be arranged in an image capture region for capturing the image data, wherein the image capture region defines an image background (illustratively of the transport container); wherein a reference pattern of the at least one reference pattern includes a contour pattern that represents an image background (e.g. if no or an empty transport container is arranged in the image capture region). Illustratively, the transport container can be arranged between an image capture system that captures the image data and the image background.

In accordance with various embodiments, the deviation variable can represent a contrast deviation of the contour pattern from the at least one reference pattern.

In accordance with various embodiments, the deviation variable can represent a contour profile deviation of the contour pattern from the at least one reference pattern.

In accordance with various embodiments, the deviation variable can represent an area occupation deviation of the contour pattern from the at least one reference pattern.

In accordance with various embodiments, the method may furthermore include: recognizing if the transport container is arranged in an image capture region in which capturing the image data is carried out. Capturing the image data is carried out if it was recognized that the transport container is arranged in the image capture region (e.g. during a search phase).

The search phase may include the following: capturing reflections (e.g. in the IR range), and comparing (e.g. in a feature-based manner) the reflections with the reference pattern (e.g. with the features from the reference image of the transport medium).

In accordance with various embodiments, the method may furthermore include: recognizing whether the transport container is arranged in an image capture region in which capturing the image data is carried out, and outputting a further signal (may also be referred to as not-recognized signal) if no transport container is arranged in the image capture region.

In accordance with various embodiments, the method may furthermore include: recognizing whether the transport container is a container type from a plurality of container types, and outputting a further signal (may also be referred to as not-recognized signal) if no container type of the plurality of container types was recognized.

In accordance with various embodiments, the predefined criterion can represent an empty transport container and the signal may include a recognized-as-empty signal.

In accordance with various embodiments, the predefined criterion can represent a non-empty transport container and the signal may include a recognized-as-non-empty signal.

In accordance with various embodiments, the predefined criterion can represent an error region in which recognition as empty is unreliable, and the signal may include or constitute an error signal.

In accordance with various embodiments, outputting the signal may include outputting an input request, wherein a checkout system process transitions into a standby state until an input is carried out in response to the input request.

In accordance with various embodiments, outputting the signal may include outputting an input request, wherein the method furthermore includes: updating the at least one reference pattern on the basis of the contour pattern if an input in response to the input request represents an empty state of the transport container.

In accordance with various embodiments, outputting the signal may include outputting an input request. The method furthermore includes: forming an additional reference pattern on the basis of the contour pattern if an input in response to the input request represents an empty state of the transport container; and adding the additional reference pattern to the at least one reference pattern (e.g. to the database).

In accordance with various embodiments, capturing the image data of the transport container may include the following: capturing image data of an image capture region in which the transport container is arranged; determining a portion of the image data of the image capture region (may also be referred to as "region of interest"—ROI or analysis region) which includes the image data of the region of the transport container.

In accordance with various embodiments, determining a portion of the image data can be carried out using one or a plurality of markers of the transport container. Illustratively, one marker or a plurality of markers can be used to enable the delimitation of the ROI by means of recognition algorithms adapted thereto.

In accordance with various embodiments, the transport container may include one or a plurality of markers (e.g. grey-scale markers (e.g.: ArUco) and/or reflection markers).

In accordance with various embodiments, capturing the image data of the transport container may include the following: capturing image data of an image capture region in which the transport container is arranged; wherein determining the contour pattern includes the following: determining a portion of the image data of the image capture region which represents an image background defined by the image capture region; comparing the portion of the image data with reference image data, wherein the reference image data represent an empty image capture region (may also be referred to as image background comparison). Illustratively, the contour pattern can be determined by determining what portion of the image background is concealed by the transport container (e.g. a lattice structure).

In accordance with various embodiments, determining the contour pattern may include the following: determining a portion of the image data (e.g. a region of interest) which has a predefined contour density, determining the contour pattern using the portion of the image data which has the predefined contour density. Illustratively, a feature-intensive region of the transport container can be used for recognition as empty.

In accordance with various embodiments, capturing the image data may include the following: successively capturing a multiplicity of image data; and determining image data of the multiplicity of image data which represent the transport container and/or which have a predefined contour density. Illustratively, a serial recording can be carried out, wherein the images which show the transport container are used for recognition as empty. Recognition as empty can thus be facilitated if the transport container does not remain in the image capture region and/or is not always positioned identically in the image capture region.

In accordance with various embodiments, capturing the image data of the transport container may include the following: capturing image data of an image capture region in which the transport container is arranged; determining a spatial location (position and/or alignment) of the transport container relative to the image capture region; determining a portion of the image data (e.g. a region of interest) of the image capture region which includes the image data of the region on the basis of the spatial location (position and/or alignment).

In accordance with various embodiments, the method may furthermore include: recognizing a container type of the transport container. The transport container is a container type from a plurality of container types. The reference pattern represents an empty transport container of the container type.

In accordance with various embodiments, the method may furthermore include: selecting the reference pattern from a multiplicity of reference patterns, each reference pattern of which is assigned to one container type of the plurality of container types.

In accordance with various embodiments, the method may furthermore include: recognizing a container type of the transport container. The transport container is a container type from a plurality of container types; wherein the criterion represents the container type.

In accordance with various embodiments, the method may furthermore include: selecting the criterion from a multiplicity of criteria, each criterion of which is assigned to one container type of the plurality of container types.

In accordance with various embodiments, the method may furthermore include: determining colour information (e.g. of the transport container) on the basis of the image data. The deviation variable furthermore represents a deviation of the colour information from reference colour information. The reference colour information represents an empty transport container.

In accordance with various embodiments, determining the deviation variable may include the following: weighting the deviation of the colour information and the deviation of the contour pattern in accordance with a predefined weight characteristic.

In accordance with various embodiments, the method may furthermore include: determining topography information (e.g. of the transport container) on the basis of the image data. The deviation variable furthermore represents a deviation of the topography information from reference topography information. The reference topography information represents an empty transport container.

In accordance with various embodiments, determining the deviation variable may include the following: weighting the deviation of the topography information and the deviation of the contour pattern in accordance with a predefined weight characteristic.

In accordance with various embodiments, the method may furthermore include: determining depth information on the basis of the image data. The deviation variable furthermore represents a deviation of the depth information from reference depth information. The reference depth information represents an empty transport container.

In accordance with various embodiments, determining the deviation variable may include the following: weighting the deviation of the depth information and the deviation of the contour pattern in accordance with a predefined weight characteristic.

In accordance with various embodiments, determining the depth information may include capturing image information of an additional region of the transport container through the region and/or through an area element of the transport container (which is arranged e.g. between the first region and the second region).

In accordance with various embodiments, the method may furthermore include: determining a first portion of the image data of the transport container, which represents a first area element of the transport container; and determining a second portion of the image data of the transport container, which represents a second area element of the transport container. The first area element and the second area element run at an angle with respect to one another and/or are arranged at a distance from one another. The second portion of the image data is captured through the first area element. The contour pattern represents the first area element and/or the second area element. Illustratively, in accordance with various embodiments, it is possible to differentiate what region of the transport container is examined, e.g. by recognizing the area element which separates the regions from one another, and/or e.g. by recognizing the area elements which delimit the regions.

In accordance with various embodiments, the contour pattern can represent at least one of the following: a contour pattern of the image background (e.g. a contour pattern of the base structure and/or of the image background structure); a lattice structure of the transport container and/or of an area element of the transport container; one or a plurality of strut arrangements of the transport container and/or of an area element of the transport container; an advertising medium of the transport container and/or of an area element of the transport container; a disturbance which is brought about by an object if the object is arranged in the transport container; and/or an image background that is defined by an image capture region in which capturing the image data is carried out.

In accordance with various embodiments, the transport container can be a shopping trolley (e.g. a compact shopping trolley) or a shopping basket.

In accordance with various embodiments, the transport container may include a first region (e.g. a first transport region) and a second region (e.g. a second transport region). The first region and the second region are separated from one another by at least one area element of the transport container.

In accordance with various embodiments, an area element may include at least one of the following: a lattice structure; one or a plurality of strut arrangements; and/or an advertising medium.

In accordance with various embodiments, the transport container may include a chassis. The chassis may include at least three, e.g. at least four, wheels (e.g. self-steering Castor wheels).

In accordance with various embodiments, the chassis can provide two degrees of freedom of translation and optionally one degree of freedom of rotation, along which the transport container is movable.

In accordance with various embodiments, a first degree of freedom of translation of the two degrees of freedom of translation and a second degree of freedom of translation of the two degrees of freedom of translation can be different relative to one another, e.g. perpendicular to one another. The two degrees of freedom of translation can run for example along an area defined by the supporting surface, e.g. horizontally.

In accordance with various embodiments, the transport container may include plastic and/or a metal, e.g. aluminium and/or steel.

In accordance with various embodiments, the second region can be arranged between the first region and the chassis.

In accordance with various embodiments, the first region may include a pivotable area element configured in such a way that at least two transport containers can be pushed one into another.

In accordance with various embodiments, the transport container may include a grip strip and/or a handle. The handle can be mounted pivotably, for example.

In accordance with various embodiments, the transport container may include an opening on a first side and an area element (e.g. illustratively a base or a side wall) on a second side opposite the first side. A cross-sectional area of the area element is less than a cross-sectional area of the opening that is parallel thereto, such that the area element fits into the opening. Illustratively, a plurality of transport containers can be configured for being fitted one into another.

In accordance with various embodiments, a device for the computer-aided recognition of a transport container being empty may include the following: an optical image capture system for capturing image data; a data storage medium for storing at least one reference pattern and/or in which at least one reference pattern is stored, wherein the reference pattern represents an empty transport container; a processor, configured to carry out the following method: capturing image data of a region of the transport container; determining a contour pattern, which represents the transport container (e.g. which is brought about by the transport container), using the image data; determining a deviation variable, which represents a deviation of the contour pattern from at least one reference pattern. The at least one reference pattern represents an empty transport container; outputting a signal if the deviation variable satisfies a predefined criterion.

In accordance with various embodiments, the optical image capture system can define an image capture region in which capturing image data is carried out. The transport container is arranged in the image capture region for capturing the image data. The image capture region defines an image background of the transport container. A reference pattern of the at least one reference pattern includes a contour pattern of the image background (e.g. if no and/or an empty transport container is arranged in the image capture region).

The processor can furthermore be configured to carry out one of the methods described herein, e.g. as described above.

In accordance with various embodiments, the image capture system may include at least two (optical) image capture sensors (e.g. provided by means of one or two cameras) for capturing depth information (e.g. stereoscopically). For determining the depth information, the image data captured by means of two image capture sensors can be superimposed on one another, e.g. taking into account a relative spatial location (position and/or alignment) of the two image capture sensors with respect to one another.

Alternatively or additionally, the image capture system may include at least one plenoptic camera (may also be referred to as light-field camera) for capturing depth information.

Alternatively or additionally, the image capture system may include a projector that is configured to project an optical pattern into the image capture region, and include an image capture sensor that is configured to capture the optical pattern for capturing depth information.

A camera may include an (optical) image capture sensor and at least one lens arrangement assigned to the image capture sensor. The lens arrangement of a plenoptic camera may include a grating composed of a plurality of microlenses.

An image capture sensor (may also be referred to as image sensor or optical sensor) may include one or a plurality of photoelectrically active regions (may also be referred to as pixels) which generate and/or modify an electrical signal e.g. in response to an electromagnetic radiation (e.g. light, e.g. visible light). The image capture sensor may include or be formed from, for example, a CCD sensor (charge-coupled device sensor) and/or an active pixel sensor (may also be referred to as CMOS sensor).

In accordance with various embodiments, an image capture sensor can be configured in a wavelength-sensitive fashion (e.g. for capturing colour information and/or for capturing a pattern projected into the image capture region).

In accordance with various embodiments, the processor can be configured to determine a contrast deviation of the contour pattern for determining the deviation variable.

In accordance with various embodiments, the processor can be configured to determine an area occupation deviation of the contour pattern for determining the deviation variable.

In accordance with various embodiments, the processor can be configured to determine a contour profile deviation of the contour pattern for determining the deviation variable.

In accordance with various embodiments, the data storage medium can be a non-volatile data memory. The data storage medium may include or be formed from, for example, a hard disk and/or at least one semiconductor memory (such as e.g. read-only memory, random access memory and/or flash memory). The read-only memory can be for example an erasable programmable read-only memory (may also be referred to as EPROM). The random access memory can be a non-volatile random access memory (may also be referred to as NVRAM).

In accordance with various embodiments, the device may furthermore include an (e.g. digital) checkout system that is configured to carry out one or a plurality of checkout system processes. A checkout system process can be for example a calculating process, an inventory process and/or a registering process.

The checkout system may include at least one of the following: a screen (may also be referred to as primary screen, e.g. a touch-sensitive screen), a printer (e.g. for printing out an invoice and/or a label), a scanner (e.g. a barcode scanner) for registering objects, a cash register drawer, an (e.g. programmable) checkout keyboard (can also be part of the touch-sensitive screen), an electronic payment means terminal (may also be referred to as EC terminal, "EC"—electronic cash, e.g. for reading a debit card and/or a credit card), and/or an additional screen (may also be referred to as secondary screen, e.g. a customer monitor), a signal output (can also be part of the screen), an operator station (in which a user operating the checkout system can be arranged).

Information representing a state of a checkout process can be displayed on the primary screen. A portion of the information displayed on the primary screen can be displayed on the secondary screen.

In accordance with various embodiments, the signal can be output by means of the signal output, e.g. by an input request being output by means of the screen and/or e.g. by an acoustic signal being output by means of an acoustic signal output.

The input request can be output for example in such a way that continuing the registering process is only possible if an input in response to the input request has been carried out.

In accordance with various embodiments, a database (may also be referred to as reference database) including one or a plurality of data sets can be stored in the data storage medium. Each data set may include a reference pattern. Furthermore, each data set may include at least one of the following items of information: reference depth information; reference topography information; reference colour information; a spatial location (e.g. position and/or alignment of a transport container) that is assigned to the reference pattern; a weight characteristic; and/or a transport container type that is assigned to the reference pattern.

Alternatively, recognizing and/or capturing can be carried out using an algorithm that is invariant with respect to a translation and/or a rotation. By way of example, it is possible to use an algorithm for fast and robust recognition of image features, a so-called "robust feature recognition algorithm" (SURF—Speeded Up Robust Features—Algorithm). The algorithm used for feature-based recognition can be rotationally invariant, for example, such that the recognition of the transport container can be carried out independently of the alignment thereof. Information concerning the spatial location of the transport container can then be dispensed with.

In accordance with various embodiments, the image capture system can be aligned in such a way that the image capture region (or the image background) has a supporting surface (e.g. a floor of a hall).

In accordance with various embodiments, a method for the computer-aided recognition of a transport container being empty may include the following: capturing image data of an image capture region in which a transport container is arranged. The image capture region defines an image background; determining a contour pattern, which represents the transport container and/or the image background, using the image data; determining a deviation variable, which represents at least one deviation of the contour pattern from at least one reference pattern. The at least one reference pattern represents an empty transport container. The method may further include outputting a signal if the deviation variable satisfies a predefined criterion. Illustratively, it is possible to determine whether a contour of the image background and/or of the transport container is concealed and/or disturbed by an object.

The topography information can represent for example a three-dimensional profile (e.g. an area in the position space). On the basis of the depth information, it is possible to determine for example a spatial location (e.g. position, alignment and/or distance with respect to a reference point) in the position space. A colour histogram and/or colour spectrum, for example, can be determined on the basis of the colour information. The deviation variable can represent for example a deviation of the three-dimensional profile, of the spatial location, of the colour spectrum and/or of the colour histogram from corresponding reference data.

In accordance with various embodiments, the criterion can represent a threshold value. The recognized-as-empty signal can be output, for example, if the deviation variable is less than the threshold value. The recognized-as-non-empty signal can be output, for example, if the deviation variable is greater than the threshold value.

In accordance with various embodiments, the transport container may include or be formed from a shopping trolley, a shopping basket or some other trolley (and/or basket).

In accordance with various embodiments, recognition of objects that have remained inside the transport container, e.g. on a lower crate support of the shopping trolley, can be made possible.

In accordance with various embodiments, in comparison with conventional pattern recognition it is possible to improve and/or enable recognition of whether or not one of the following objects (e.g. goods, may also be referred to as articles) is arranged in the transport container (which objects cannot be determined reliably e.g. by means of colour histograms or depth information): a flat object (which may limit e.g. 3D capture), an object having hardly any or no accentuation and/or colouration (e.g. having only low information, colour and/or texture content), a single-coloured and/or homogeneous object (for example virtually homogenous layout such as black, white, grey, etc.), a transparent object.

In accordance with various embodiments, recognizing the object can be based on the fact that the object disturbs (or interrupts) the contour pattern (e.g. a lattice contour) of the transport container and/or of the image background and/or brings about a contrast with respect to the transport container and/or with respect to the image background (e.g. supporting surface and/or floor).

In accordance with various embodiments, computer-aided recognition of objects in an open transport container is provided. The state of the transport container (empty state, non-empty state and/or full state) can thus be recognized at a specific point in time and/or location, e.g. in an automated manner.

In accordance with various embodiments, an image capture system (e.g.: Intel RealSense F200, INTEL R200 and/or Intel SR300) may include a 2D image capture sensor and/or a 3D image capture sensor.

The processor can be provided by means of an electronic (programmable) data processing system. The electronic data processing system may furthermore include the data storage medium. By way of example, the electronic data processing system may include or be formed from a microcomputer, e.g. a PC system (Personal Computer System) or a digital checkout system.

The processor can be coupled to the image capture system by means of a USB interface (Universal Serial Bus interface), e.g. via USB 3.0.

In accordance with various embodiments, the data processing system may include at least one coprocessor (e.g. provided by means of a coprocessor card or external graphics card), e.g. a graphics processing unit (GPU). By means of the coprocessor, an acceleration of the computationally intensive processes can be achieved by swapping the latter into the coprocessor.

FIG. 1 illustrates a method 100 in accordance with various embodiments in a schematic flow diagram.

In accordance with various embodiments, the method 100 may include in 101: capturing image data, of a region of the transport container. The method 100 may furthermore include in 103: determining a contour pattern, which represents the transport container (e.g. which is brought about by the transport container), using the image data. The method 100 may furthermore include in 105: determining a deviation variable, which represents a deviation of the contour pattern from at least one reference pattern. The at least one reference pattern represents an empty transport container. The method 100 may furthermore include in 107: outputting a signal if the deviation variable satisfies a predefined criterion.

FIG. 2 illustrates a device 200 in accordance with various embodiments in a schematic view.

The device 200 may include an optical image capture system 202, a data storage medium 204 and a processor 206. The processor 206 can be coupled to the optical image capture system 202 and the data storage medium 204, e.g. by means of a data line (i.e. such that data can be transferred between them).

By way of example, the processor 206 can be configured to capture image data by means of the optical image capture system 202. By way of example, the processor 206 can control the image capture system 202.

By way of example, the image data can be stored in a data storage medium 202d (may also be referred to as buffer memory 202d) of the image capture system 202. The image data can be captured by means of an optical sensor 202s (may also be referred to as image capture sensor 202s). At least processing of the image data by means of the processor 206 enables said image data to be read out from the buffer memory 202d.

The optical sensor 202s may include a photoelectrically active surface 202o directed towards an image capture region 208, e.g. in the direction 208b (may also be referred to as image capture direction 208b).

FIG. 3 illustrates a device 300 in accordance with various embodiments in a schematic perspective view.

In accordance with various embodiments, a transport container 400, e.g. a shopping trolley, as is illustrated in FIG. 3, can be arranged in the image capture region 208. The transport container 400 may include a chassis 312 having a plurality of rotatably mounted wheels 312r, and a transport framework 322. The transport framework 322 can be mounted movably by means of the chassis 312. The transport framework 322 can provide at least one transport region 322a.

The transport container 400 may include a grip 302g, by means of which the transport container 400 can be guided, e.g. by a person. The transport container 400 can stand and/or be moved on a supporting surface 208u. The supporting surface 208u can delimit the image capture region 208. The supporting surface 208u can define e.g. the image background of the image capture region 208.

By way of example, the image capture direction 208b of the image capture sensor 202s can be directed towards the supporting surface 208u. The image capture direction 208b can optionally be configured for varying the image capture direction 208b, e.g. for varying by at least one angle 202w (e.g. a solid angle). By way of example, the image capture direction 208b can thus be adapted, e.g. on the basis of the image data and/or recognition of a location of the transport container in the image capture region 208. Illustratively, by way of example, the image capture direction 208b can be tracked to a moving transport container 400 and/or be adapted to a transport container 400 that is not precisely positioned.

Alternatively or additionally, the angle 202w can define an image capture angle 202w (may also be referred to as viewing angle). The image capture angle 202w can be understood to mean that angle in the position space which is delimited by the edges of the recording format. In the case of the customary rectangular image format, the image capture angle 202w can be taken to mean the value associated with the image diagonal. Horizontal and vertical image capture angles 202w can be less than the value associated with the image diagonal.

The image capture system 202 can be held by means of a carrier 320, e.g. by means of a checkout desk 320. Optionally, a plurality of elements of the checkout system can be arranged on the checkout desk 320, e.g. screen, printer, scanner and/or a payment means terminal.

In accordance with various embodiments, it is possible to search for the transport container 400 in the image capture region 208 (may also be referred to as field of view of the camera).

For capturing image data (and recognition as empty on the basis thereof) of the transport container 400, a direct visual link can be provided between the image capture system 202 and the transport container 400. In other words, optical recognition of objects in the transport container 400 can be carried out.

FIG. 4 illustrates a transport container 400 in accordance with various embodiments in a schematic side view or cross-sectional view, e.g. a transport container 400 of a first transport container type.

The transport framework 322 may include a plurality of transport regions 322a, 322b (a first transport region 322a and a second transport region 322b), each of which can be configured for receiving an object (which is intended to be transported). By way of example, each transport region 322a, 322b can be provided and/or delimited by means of a support area element 402a, 402b (e.g. a base element).

The transport framework 322 may include a plurality of area elements, e.g. one or a plurality of support area elements 402a, 402b (e.g. base elements 402a, 402b), one or a plurality of side area elements 412a, 412b (e.g. side elements 412a, 412b). Each transport region 322a, 322b can be delimited by one or a plurality of area elements, e.g. by at least one support area element 402a, 402b and optionally by a plurality of (in respect of four) side area elements 412a, 412b. At least one first side area element 412b can be mounted pivotably 401, e.g. between an open state and a closed state. In an open state, an opening 402o can be formed which is configured (size and location) in such a way that a second side area element 412b fits into the opening 402o. A plurality of transport containers 400 can thus be pushed one into another, e.g. in direction 403.

By way of example, the cross-sectional area (section taken e.g. transversely with respect to the direction 403) of the first transport region 322a can decrease in the direction 403, pointing from the first side area element 412a to the second side area element 412b.

In at least one direction, each transport region 322a, 322b can be open 502o (i.e. have an opening 502o), such that e.g. illustratively an object can pass through the opening 502o into the transport region 322a, 322b.

In accordance with various embodiments, the transport container 400 may include an area element (e.g. a support area element 402a, 402b and/or a side area element 412a, 412b) having a plurality of through openings (e.g. a lattice or a grid). By way of example, the transport container 400 may include an intermediate base area 402a that is not completely closed, in order to enable recognition in the second transport region 322b (illustratively lower transport region 322b) from a predefined perspective (e.g. from above) in which the intermediate base area 402a is arranged between the image capture system 202 and the second transport region 322b.

In accordance with various embodiments, a first support area element 402a (may also be referred to as intermediate base area 402a) and/or a second support area element 402b can have a plurality of through openings. In other words, it is possible for the first support area element 402a and/or the second support area element 402b not to be visually opaque. This can make it possible that through the first support area element 402a it can be determined whether an object is arranged in the second transport region 322b, e.g. by means of depth information. By way of example, on the basis of the depth information it can be determined that specific features are assigned to the first support area element 402a, and can be rejected for forming the contour pattern if e.g. only the second transport region 322b is intended to be examined.

Alternatively or additionally, this can make it possible that through the first support area element 402a contours of the second support area element 402b and/or of the image background 602h can be used for forming the contour pattern. Analogously, this can make it possible that through the second support area element 402b contours of the image background can be used for forming the contour pattern. Recognition as empty can thus be facilitated (illustratively since the contour pattern has more features).

Alternatively or additionally, the side area elements 412a, 412b (e.g. those which face the image capture system 202) can have a plurality of through openings. This can make it possible that through a side area element 412a, 412b contours of the first support area element 402b, of the second support area element 402b and/or of the image background can be used for forming the contour pattern. By way of example, on the basis of the depth information it can be determined that specific features are assigned to a side area element 412a, 412b and can be rejected for forming the contour pattern.

By way of example, a (not visually opaque) area element 402a, 402b, 412a, 412b may include or be formed from an (e.g. metallic or non-metallic) lattice structure. Alternatively or additionally, a (not visually opaque) area element 402a, 402b, 412a, 412b may include or be formed from a continuous (e.g. transparent or partly transparent) area or a combination of a continuous area and a lattice structure (e.g. transparent and/or semi-transparent).

A plurality of transport container types may include a chassis 312 and a transport framework 322. By way of example, two transport container types can differ in at least one of the following: an extent of the first region 322a and/or of the second region 322b, in the presence of the first region 322a and/or of the second region 322b.

FIG. 5 illustrates a transport container 400 in accordance with various embodiments in a schematic side view or cross-sectional view, e.g. a transport container 400 of a second transport container type.

The first transport container type can differ from the second transport container type in at least the presence of a chassis 312.

The transport container 400 may include an open transport region 322a (having an opening 502o). The transport region 322a can be delimited by a support area element 402a and a plurality of side area elements 412a, 412b.

In accordance with various embodiments, the cross-sectional area (e.g. section taken transversely with respect to the direction 403) of the first transport region 322a can decrease in the direction 403, pointing from the opening 502o to the support area element 402a. What can thus be achieved is that a plurality of transport containers 400 can be fitted one into another, e.g. along direction 403, e.g. for stacking the plurality of transport containers 400.

The transport container 400 may include a grip 502, which can optionally be mounted pivotably.

Analogously to the description given above, optionally through the support area element 402a contours of the image background can be captured and used for forming the contour pattern if this has e.g. a plurality of through openings. Recognition as empty can thus be facilitated.

Analogously to the description given above, optionally through the side area element 412a, 412b contours of the image background and/or of the support area element 402a can be captured and used for forming the contour pattern e.g. if this has e.g. a plurality of through openings. Recognition as empty can thus be facilitated.

It is possible for a plurality of transport container types not to have a chassis 312. By way of example, two transport container types can differ in at least one extent of the region 322a (e.g. height and/or width).

FIG. 6 illustrates a method 600 in accordance with various embodiments in a schematic flow diagram.

In accordance with various embodiments, image data 602 of a region of the transport container 400 can be captured 602e. A contour pattern 604a, 604b, 604c, which represents the transport container 400, can be determined using the image data 602.

A first contour pattern 604a can represent for example an image background 602h of the image capture region (e.g. the supporting surface 208u) which is disturbed on account of the transport container 400. Illustratively, a structure 400s (e.g. a lattice) of the transport container 400 can conceal a part of the image background 602h, such that the contour profile thereof is disturbed, e.g. interrupted 612s.

Alternatively, a second contour pattern 604b can represent for example the structure 400s (e.g. a lattice 400s) of the transport container 400.

In accordance with various embodiments, a third contour pattern 604c can represent the structure 400s (e.g. a lattice) of the transport container 400 and the image background 602h of the image capture region 208.

Furthermore, the first contour pattern 604a, the second contour pattern 604b and/or the third contour pattern 604c can be used for determining the deviation variable.

The contour pattern 604 (e.g. the contour pattern 604a, the contour pattern 604b and/or the contour pattern 604c) can be used as a reference pattern, for example, if the transport container 400 is empty. Illustratively, a reference contour pattern can be learned.

Illustratively, the optical features of the transport container 400 (such as e.g. a shopping trolley) or of feature-intensive regions thereof and/or of the supporting surface/image background can be initially learned. The recognized features can be stored in a reference database.

Figure 7:
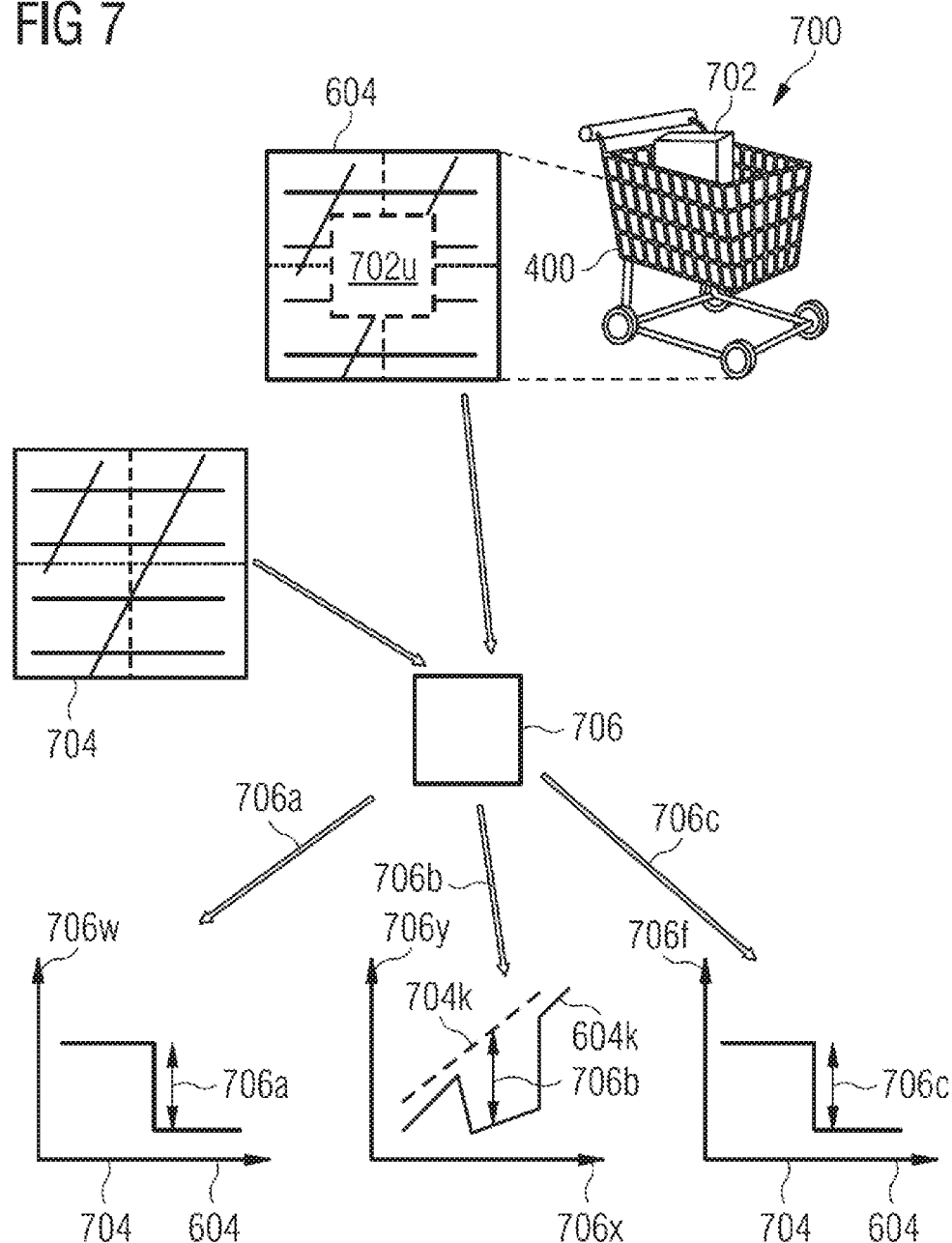
FIG. 7 shows a method in accordance with various embodiments in a schematic flow diagram.

FIG. 7 illustrates a method 700 in accordance with various embodiments in a schematic flow diagram.

In accordance with various embodiments, a determined contour pattern 604 (e.g. the contour pattern 604a, the contour pattern 604b and/or the contour pattern 604c) can have a contour that represents an object 702 if the latter is arranged in the transport container 400. Illustratively, the contour of the transport container 400 and/or of the image background can be disturbed, e.g. (at least partly) concealed, by the object 702. By way of example, the contour pattern 604 can have one or a plurality of disturbances 702u (e.g. interruptions) which are brought about by the object 702.

The contour pattern 604 can be compared with a reference contour pattern 704 (may also be referred to as reference pattern 704). The reference pattern 704 can represent the image background 602h of the image capture region and/or the structure 400s of the transport container 400 if the transport container 400 is empty.

A deviation variable 706 representing a deviation of the contour pattern 604 from the reference pattern 704 can be determined on the basis of the contour pattern 604 and the reference pattern 704. The reference pattern 704 may include a contour pattern of the image capture region in which no or an empty transport container 400 is arranged (e.g. an empty transport container 400 against the image background 602h).

The deviation variable 706 can represent a contrast deviation 706a, a colour deviation 706a, a contour profile deviation 706b and/or an area occupation deviation 706c. The contrast deviation 706a can illustratively indicate the magnitude of a deviation in a contrast between the reference pattern 704 and the contour pattern 604. The contour profile deviation 706b can illustratively indicate the magnitude of an interruption in a profile of a contour between the reference pattern 704 and the contour pattern 604. The area occupation deviation 706c can illustratively indicate the magnitude of a deviation in an area occupied in each case by the contours of the reference pattern 704 and of the contour pattern 604.

The contrast deviation 706a can be determined for example pixel by pixel, e.g. by comparing the values 706w (e.g. contrast values 706w and/or brightness values 706w) of mutually corresponding pixels of the reference pattern 704 and of the contour pattern 604.

As an alternative or in addition to the contrast deviation 706a, a colour deviation 706a can be determined, for example pixel by pixel, e.g. by comparing the values 706w (e.g. colour values 706w and/or brightness values 706w) of mutually corresponding pixels of the reference pattern 704 and of the contour pattern 604.

For the contour profile deviation 706b, by way of example, a reference contour 704k of the reference pattern 704 can be assigned to a contour 604k of the contour pattern 604 and the (e.g. spatial and/or pixel-by-pixel) deviation 706 of the contour 604k from the reference contour 704k can be determined. The deviation 706b of the contour 604k from the reference contour 704k can be determined e.g. in a position space and/or a pixel space that is spanned by at least two coordinates 706x, 706y (spatial coordinates and/or pixel coordinates).

The area occupation deviation 706c can be determined for example by comparing the area occupation 706f (e.g. number of occupied pixels and/or occupied proportion of the pattern) of the reference pattern 704 and of the contour pattern 604.

The deviation variable 706 can have a numerical value (e.g. an area occupation deviation 706c, a contrast deviation 706a and/or a colour deviation), a vector (e.g. a contour deviation, a depth deviation, spatial coordinates and/or pixel coordinates) and/or a matrix (e.g. a topography deviation).

Figure 8:
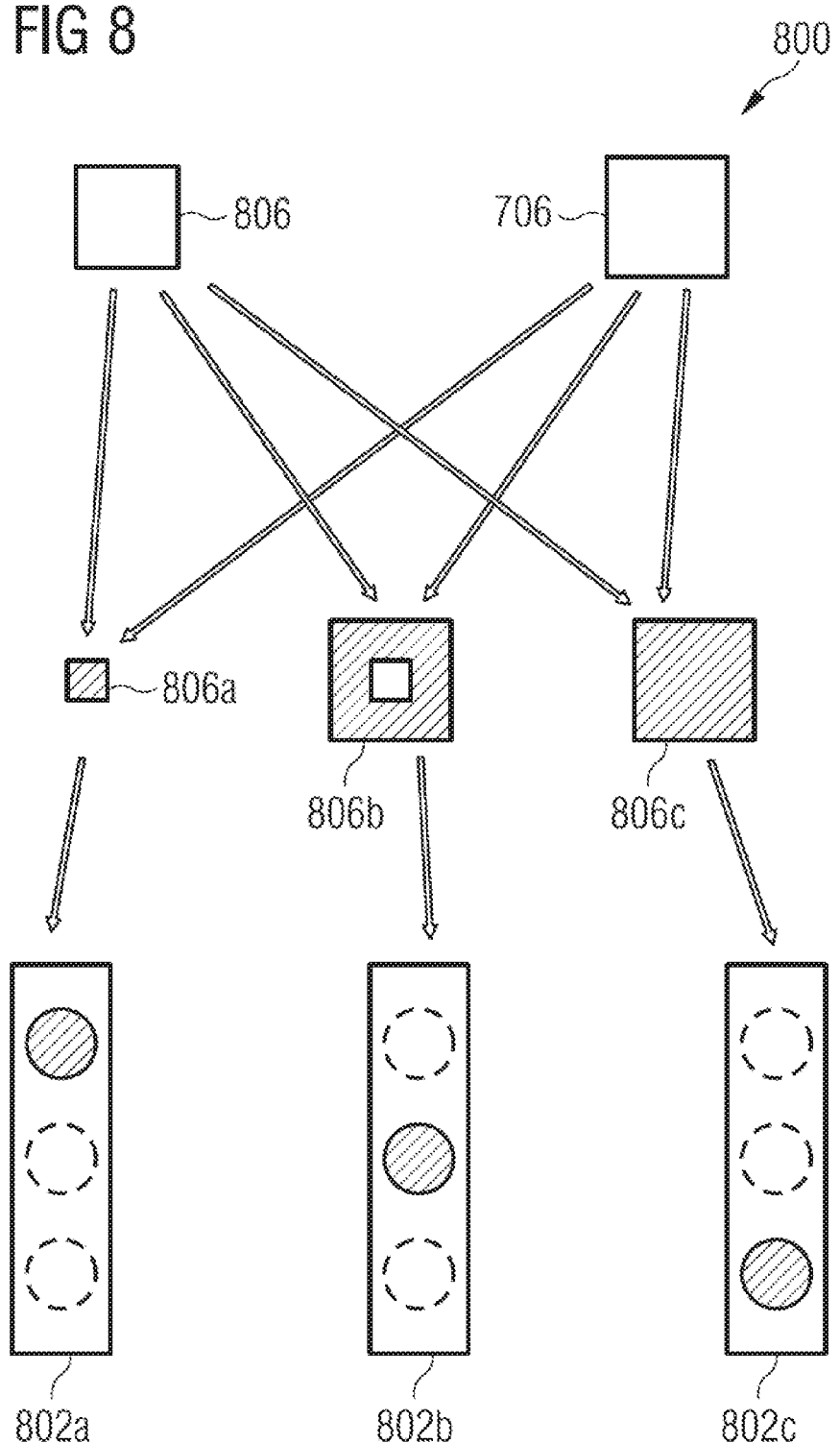
FIG. 8 shows a method in accordance with various embodiments in a schematic flow diagram.

FIG. 8 illustrates a method 800 in accordance with various embodiments in a schematic flow diagram.

In accordance with various embodiments, the deviation variable 706 can be compared with a predefined criterion 806. Furthermore, a signal can be output if the deviation variable 706 satisfies the criterion 806. The signal may include or be formed from, for example, a visual signal (e.g. a coloured signal and/or a geometrical signal), an input request and/or an acoustic signal.

The predefined criterion 806 may include a first criterion 806a (may also be referred to as empty criterion 806a), which represents an empty transport container. The signal may then include a first signal 802a (may also be referred to as recognized-as-empty signal 802a), which represents recognition as empty. Illustratively, the first signal 802a can be output, for example, if the deviation variable 706 is less than a first threshold value represented by the first criterion 806a.

The predefined criterion 806 may include a second criterion 806b (may also be referred to as error criterion 806b), which represents an error region. The signal may then include a second signal 802b (may also be referred to as error signal 802b), which represents error recognition. Illustratively, the second signal 802b can be output, for example, if the deviation variable 706 is greater than the first threshold value and less than a second threshold value, which is represented by a third criterion 806c.

The predefined criterion 806 may include the third criterion 806c (may also be referred to as non-empty criterion 806c), which represents a non-empty transport container. The signal may then include a third signal 802c (may also be referred to as recognized-as-non-empty signal 802c), which represents recognition as non-empty. Illustratively, the third signal 802c can be output if the deviation variable 706 is greater than the second threshold value, which is represented by the third criterion 806c.

Illustratively, the error region can lie between the empty criterion 806a and the non-empty criterion 806c and represent a region in which an unambiguous decision as to whether or not the transport container 400 is empty cannot reliably be taken.

In the case of error recognition, the method 100 can start from the beginning. By way of example, a different region of the transport container 400 and/or a different analysis region can be used for forming the contour pattern 604.

Figure 9:
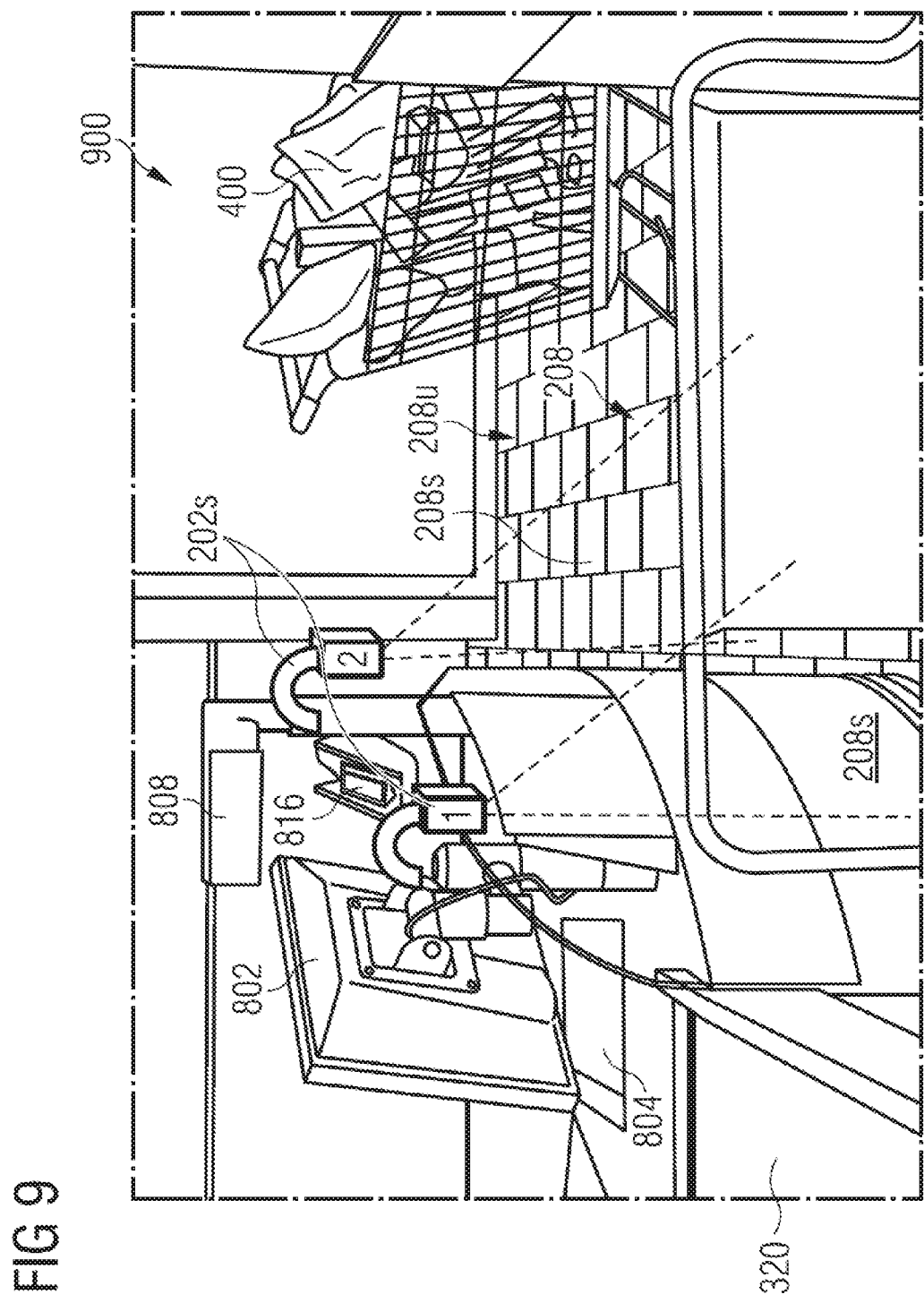
FIG. 9 shows a device in accordance with various embodiments in a schematic perspective view.

FIG. 9 illustrates a device 900 in accordance with various embodiments in a schematic perspective view.

The checkout system may include a primary screen 802, a barcode scanner 804, a secondary screen 808 and an EC terminal 816. The screen 802 can be configured for outputting the signal. By way of example, it is possible to display on the screen a coloured signal, a geometrical signal and/or an input request, which represents a state of the transport container 400 (here arranged outside the image capture region 208) (e.g. empty or non-empty) and/or a state of the image capture region 208 (e.g. with or without transport container 400).

The device 900 may include an image capture system 202 including a plurality of optical sensors 202s. Each sensor 202s can define a capture region 208s, which together define the image capture region 208. By way of example, the capture regions 208s of at least two sensors 202s of the image capture system 202 can overlap. The mounting positions illustrated can be understood as being by way of example. The two sensors 202s can alternatively be mounted in such a way that their capture regions are at a distance from one another or adjoin one another.

The supporting surface 208u can have a contour representing e.g. the floor covering (e.g. the tiles thereof and/or the joints thereof).

In accordance with various embodiments, it is possible to search for the transport container 400 in the image capture region 208. In this case, it is possible to recognize whether the transport container 400 is a container type from a plurality of (known) container types, e.g. the first container type or the second container type. Alternatively or additionally it is possible to recognize whether a transport container 400 is arranged in the image capture region 208.

Furthermore, a signal (may also be referred to as not-recognized signal) can be output if no container type of the plurality of container types was recognized and/or no transport container 400 was recognized in the image capture region 208. In the case where no container type of the plurality of container types and/or no transport container 400 were/was recognized in the image capture region 208, error recognition may be evident. The not-recognized signal may then be an error signal.

In the case of error recognition, the method 100 can start from the beginning. By way of example, image data from a different region of the image capture region 208 can be used for forming the contour pattern 604.

In accordance with various embodiments, the signal (e.g. the error signal) may include an input request, wherein a checkout system process transitions into a standby state until an input in response to the input request is carried out. An operator (e.g. the checkout cashier) can thus be encouraged to establish a state (e.g. by shifting the transport container 400), in which the transport container 400 and/or the transport container type thereof can be recognized. Unregistered articles can thus be reduced further.

If the transport container and/or the transport container type thereof were/was recognized, the contour pattern 604 can be determined. Alternatively or additionally, a reference pattern that represents the transport container type can be selected. Thus, determining the deviation variable can be carried out more accurately or error recognition can be reduced. Illustratively, the reference pattern can be adapted to the transport container type determined, such that the reference pattern of the recognized transport container type is used for determining the deviation variable.

Optionally, the predefined criterion can be adapted on the basis of the recognized transport container type. By way of example, a first criterion can be used for the first transport container type and a second criterion can be used for the second transport container type. Thus, recognition as empty can be carried out more accurately or error recognition can be reduced.

The primary screen 802 can be configured for displaying information representing the articles or article registered by means of the barcode scanner 804. The registered articles can for example be listed and displayed together with information (e.g. registering information) assigned thereto on the primary screen 802, e.g. with article number information, article name information and/or price information.

Figure 10:
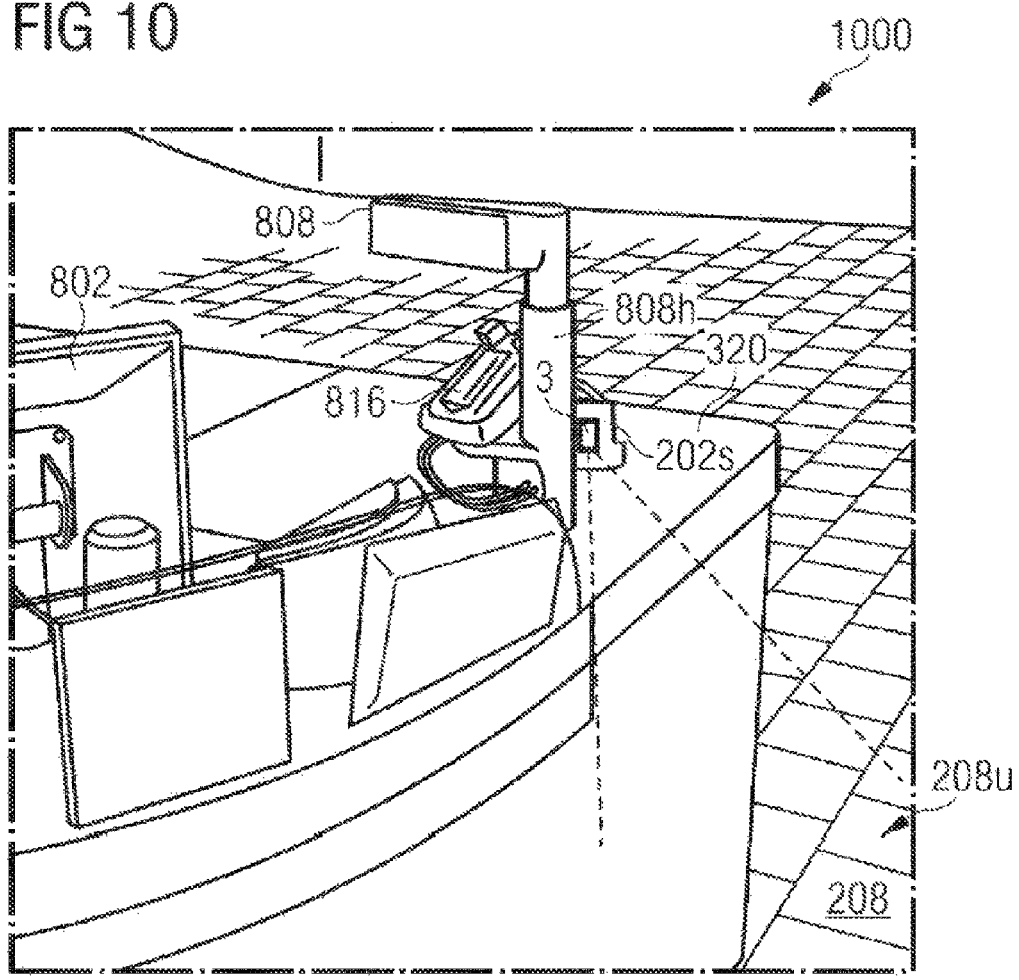
FIG. 10 shows a device in accordance with various embodiments in a schematic perspective view.

FIG. 10 illustrates a device 1000 in accordance with various embodiments in a schematic perspective view.

In accordance with various embodiments, at least one optical sensor 202s can be fixed to a holder 808h (e.g. a rod) that holds the secondary screen 808. The secondary screen 808 can be configured illustratively for displaying a portion of the information displayed by means of the primary screen 802, e.g. article name information and/or price information.

Figure 11:
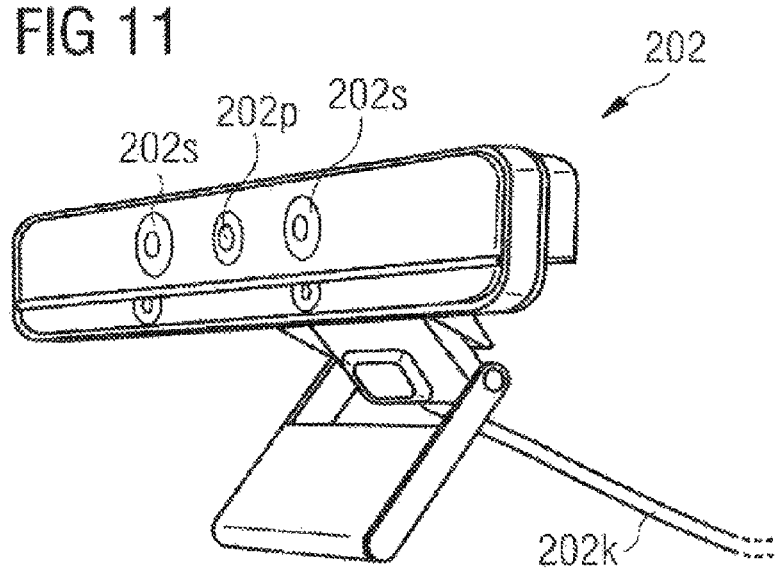
FIG. 11 shows an image capture system in accordance with various embodiments in a schematic perspective view.

FIG. 11 illustrates an image capture system 202 in accordance with various embodiments in a schematic perspective view.

The image capture system 202 may include a plurality of (e.g. two or more than two) image capture sensors 202s. The image capture system 202 may include a fixing structure, at which the image capture system 202 can be fixed. Furthermore, the image capture system 202 may include a data line 202k, by means of which the image capture system 202 can be coupled e.g. to the processor 206.

The image capture system 202 can be configured to capture image data representing two-dimensional (2D) information, e.g. in a position space. Optionally, the image capture system 202 can be configured to capture image data representing three-dimensional (3D) information (may also be referred to as depth information), e.g. in a position space.

The image capture system 202 may optionally include a laser projector 202p configured to project an optical pattern into the image capture region 208, e.g. by means of structured laser light (i.e. light structured in the form of the pattern). In other words, the laser projector 202p can emit light in accordance with the pattern (e.g. in the form of a lattice) into the image capture region 208. The emitted light can be outside the range of visible light, e.g. in an infrared (IR) spectral range (more than approximately 780 nm). Alternatively or additionally, other spectral ranges can be used, e.g. also in the visible range of light (approximately 380 nm to approximately 780 nm). If light from external light sources is emitted into the image capture region, it is possible to use spectral ranges which lie e.g. outside that of the light emitted by the external light sources. At least one image capture sensor 202s can be configured to capture the spectral range of the laser projector 202p. Deformations of the pattern which are brought about by a topography in the image capture region and/or of an object in the image capture region can thus be captured by means of the image capture sensor 202s (i.e. topography information can be determined). In other words, the image capture sensor 202s can capture 3D image data. The 3D image data can then be processed further by the processor. On the basis of the optical pattern projected into the image capture region 208, alternatively or additionally depth information can be obtained, e.g. by determining a distance between the image capture system 202 and contours, objects and/or structures in the image capture region and/or by evaluating the topography information.

Alternatively or additionally, the image capture system 202 can be designed to capture stereoscopic image data by means of the at least two image capture sensors 202s. The image data may then include two image data portions which are assigned to one another and which are recorded at the same time from different angles.

The image data can be processed by means of the processor, in order thus e.g. to measure the distance between the image capture system 202 and contours, objects and/or structures in the image capture region (i.e. to determine depth information).

Figure 12:
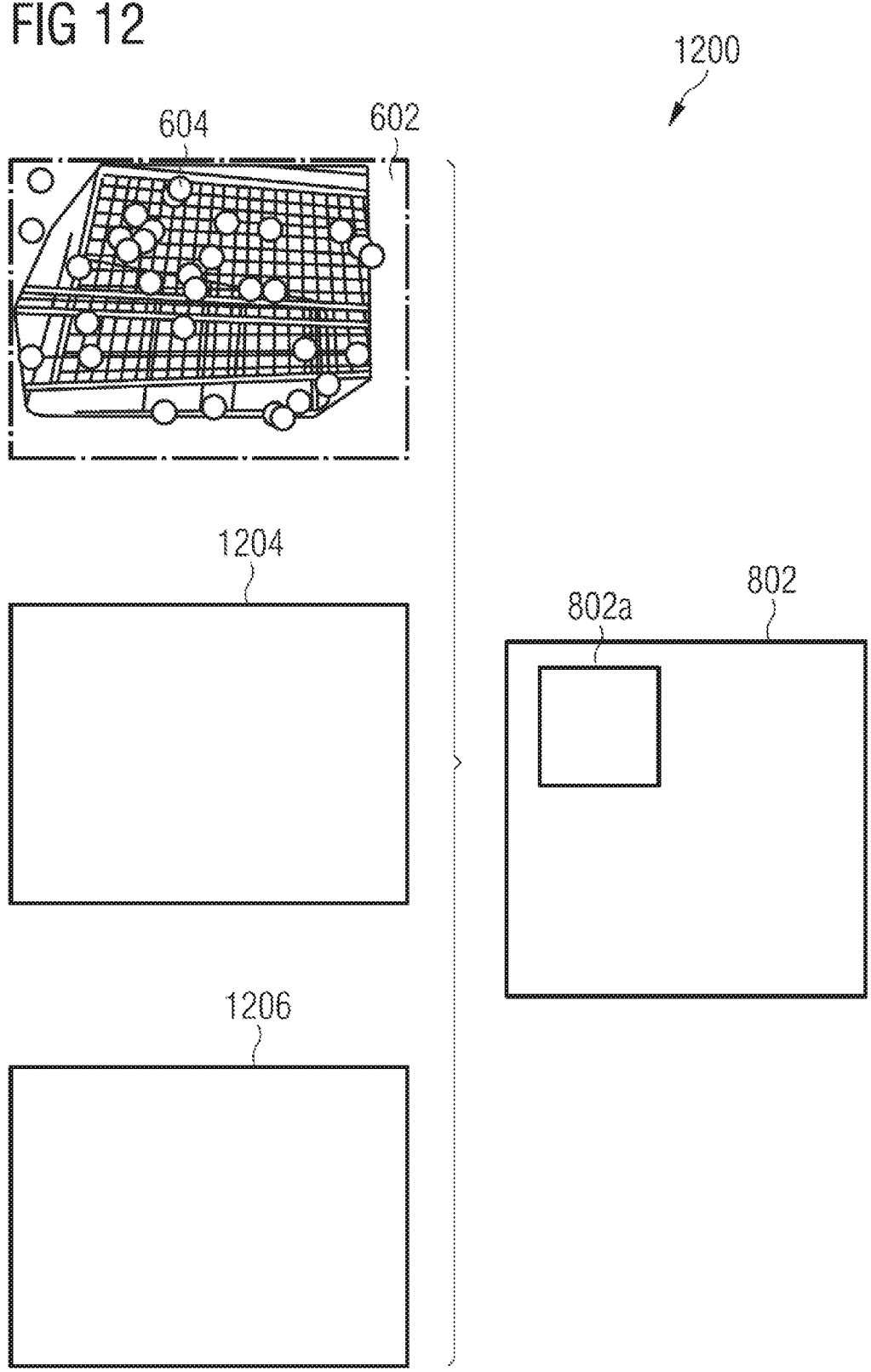
FIG. 12 shows a method in accordance with various embodiments in a schematic view.

FIG. 12 illustrates a method 1200 in accordance with various embodiments in a schematic view.

In a 2D mode, firstly it is possible to recognize whether a transport container 400 is arranged in the image capture region 208 (i.e. whether a transport container 400 is present). By way of example, recognition can be carried out by means of detecting reflections (on objects), e.g. in the IR range. It is possible to recognize whether the reflections originate from a transport container, e.g. from the structure thereof and/or from markers. This can make it possible to carry out recognition more rapidly. The reflections can optionally be compared with the reference pattern. For this purpose, the reference pattern may include reference reflection data.

The recognition of the transport container 400 can be carried out on the basis of the image data 602. By way of example, on the basis of the image data 602 it is possible to carry out a pattern recognition and/or a contour recognition, which is compared with the database. The contour recognition may for example merely determine whether or not a contour is present.

Alternatively or additionally, the contour pattern 604 (superimposed on the image data in the illustration) can be determined in order to recognize whether a transport container 400 is arranged in the image capture region 208.

Furthermore, in the 2D mode, e.g. if it was recognized that a transport container 400 is arranged in the image capture region 208, on the basis of the contour pattern 604 it can be determined whether an object is arranged in the transport container 400. If a deviation of the contour pattern 604 from the reference pattern 704 satisfies the criterion (e.g. all elements of the contour pattern 604 correspond to the elements of the reference pattern 704), a recognized-as-empty signal 802a can be output, for example on the primary screen 802. The recognized-as-empty signal 802a can display for example information representing the fact that the transport container 400 was recognized as empty, e.g. lettering and/or a colour (e.g. green).

Optionally, in the 2D mode, a deviation of the colour information 1204 can be used in order to determine the deviation variable. By way of example, it is possible to determine whether (and if so how many) pixels of the image data 602 have a colour value that deviates from the reference colour information. If the transport container 400 has only grey shades, for example, it can be determined whether the image data 602 have colour values.

Alternatively or additionally, in a 3D mode, it is possible to determine whether (and if so how many) pixels of the image data 602 have a depth value (e.g. a distance with respect to the image capture system 202) that deviates from the reference depth information. Optionally, a topography representing the transport container 400 (or, if appropriate, the content thereof) can be determined on the basis of the image data 602.

By way of example, firstly a first transport region 322a can be checked in the 2D mode and optionally afterwards a second transport region 322b situated behind it can be checked in a 3D mode (i.e. the first transport region 322a is arranged between the second transport region 322b and the image capture system 202).

Figure 13:
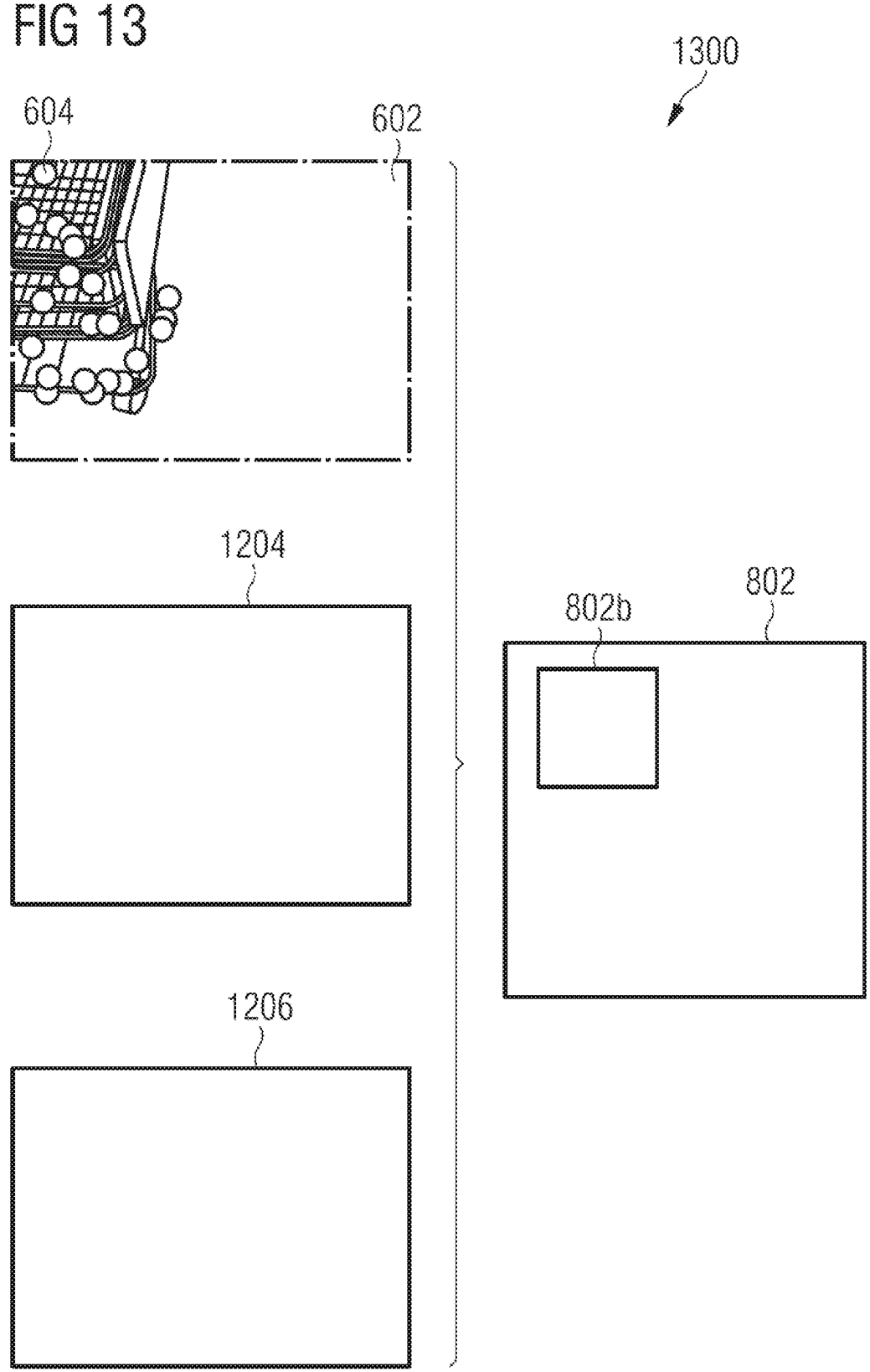
FIG. 13 shows a method in accordance with various embodiments in a schematic view.

FIG. 13 illustrates a method 1300 in accordance with various embodiments in a schematic view.

In the 2D image mode, it can be determined if the transport container 400 is not arranged in the image capture region 208 (e.g. was not placed in front of the checkout system and/or is at least partly concealed). By way of example, the contour pattern 604 may have fewer features than is predefined by the criterion. Alternatively or additionally, the contour pattern 604 may have features representing an edge of the transport container 400. Illustratively, it can be determined whether the transport container 400 is not arranged completely in the image capture region 208 and/or is at least partly concealed (e.g. by a person).

If no transport container 400 was recognized in the image capture region 208 and/or it was recognized that said transport container is not arranged completely in the image capture region 208 and/or is at least partly concealed, then an error signal 802b can be output, e.g. an error signal 802b (e.g. the not-recognized signal). The error signal 802b can be output for example on the primary screen 802. The error signal 802b can display for example information representing the fact that no transport container 400 was recognized, e.g. lettering and/or a colour (e.g. yellow).

Optionally, in addition (in the 2D mode) colour information 1204 and/or (in the 3D mode) depth information 1206 can be used in order to recognize whether a transport container 400 is arranged in the image capture region 208. By way of example, the contour pattern 604 cannot be unambiguously recognized if the image capture region 208 is illuminated to an excessively great extent. In that case, e.g. if the recognition of the transport container 400 on the basis of the contour pattern and/or the colour information 1204 and/or the depth information 1206 leads to different results, the error signal 802b may include information representing the cause of the error.

Optionally, if the transport container type was not recognized, the error signal 802b may include information representing the cause of the error "transport container type not recognized".

If the transport container 400 includes regions which tend towards error recognition (e.g. advertising areas or highly reflective errors), these regions (error region) can be masked out (i.e. not used for determining the contour pattern 604). Alternatively or additionally, the error signal 802b may include information representing a corresponding cause of the error (e.g. "error region recognized").

FIG. 14 illustrates a method 1400 in accordance with various embodiments in a schematic view.

In the case where the transport container 400 was recognized in the image capture region 208 (e.g. in the 2D mode), but no decision can be taken about whether said transport container is empty or non-empty (that is to say that an object is arranged in the transport container 400), an error signal 802b can be output. By way of example, the error signal 802b can be output if no contour pattern could be determined, if the image data are noisy, underexposed and/or overexposed. By way of example, in the 2D mode, transparent objects, thin objects and/or small objects may disturb the contour pattern only in part but to such a great extent that determining the contour pattern is impaired.

Optionally, in addition, colour information 1204 (in the 2D mode) and/or depth information 1206 (in the 3D mode) can be used in order to recognize whether the transport container 400 is present. However, the case can also occur in which the colour information 1204 cannot be unambiguously assigned, e.g. if the object has a low saturation (e.g. a white colour), a high reflectivity or is at least partly covered by a part of the transport container 400.

The error signal 802b can represent for example information which represents the cause of an error "transport container type recognized" and/or "no decision possible", e.g. lettering and/or a colour (e.g. orange).

Figure 15:
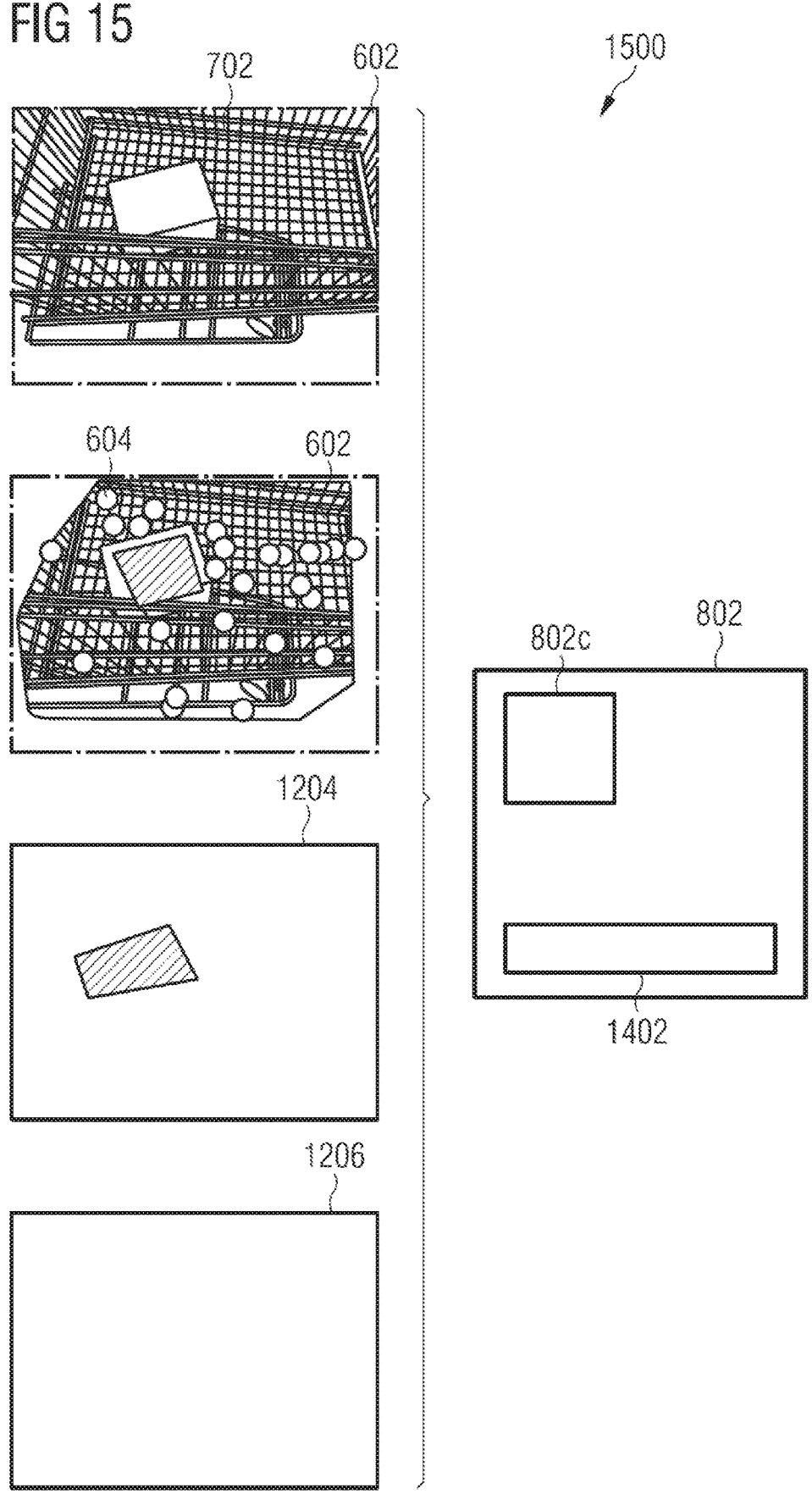
FIG. 15 shows a method in accordance with various embodiments in a schematic view.

FIG. 15 illustrates a method 1500 in accordance with various embodiments in a schematic view.

In accordance with various embodiments, on the basis of the contour pattern 604 (here illustrated in a manner superimposed with the image data 602) it can be recognized if an object 702 is arranged in the transport container 400, e.g. in the first transport region 322a.

If an object 702 (e.g. an article) was recognized in the transport container 400 in the 2D mode, a recognized-as-non-empty signal 802c can be output, for example on the primary screen 802. The recognized-as-non-empty signal 802c can display for example information representing the fact that the transport container 400 was recognized as non-empty, e.g. lettering and/or a colour (e.g. red). Alternatively or additionally, the recognized-as-non-empty signal 802c may include an input request 1402. The input request 1402 can demand for example a confirmation as to whether the recognized-as-non-empty signal 802c is correct (i.e. a false alarm was not triggered). If the recognized-as-non-empty signal 802c is incorrect (i.e. a false alarm was triggered), i.e. it was incorrectly recognized that an object is arranged in the transport container 400, optionally the criterion can be adapted, e.g. in such a way that a contour pattern 604 similar to that which leads to the false alarm will trigger an error signal in the future (e.g. that the contour pattern determined falls within the error region).

Optionally, on the basis of the colour information 1204 it can be recognized and/or confirmed whether the object 702 is arranged in the transport container 400, e.g. in the first transport region 322a. By way of example, the contour and colour recognition can be triggered simultaneously.

Figure 16:
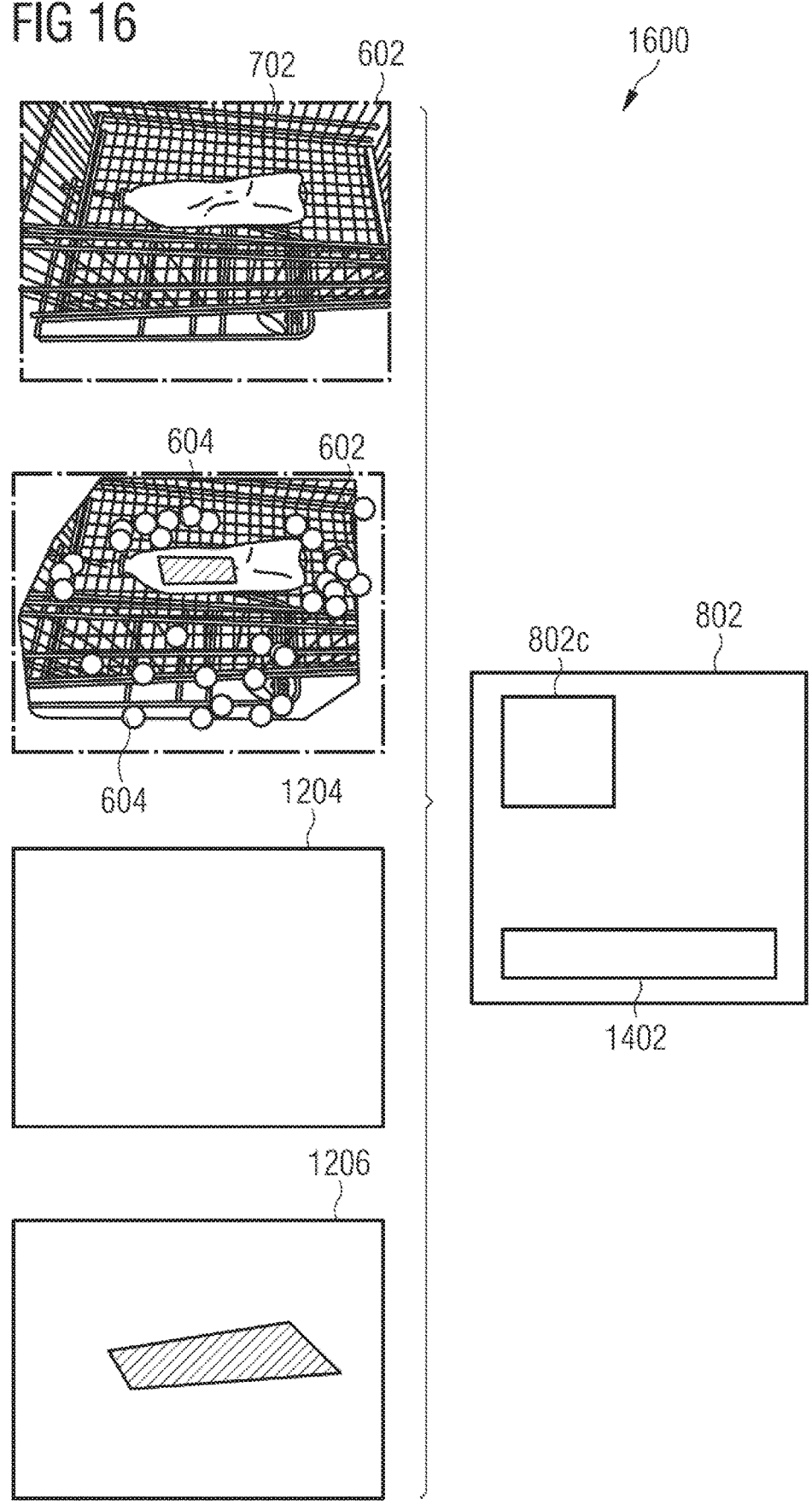
FIG. 16 shows a method in accordance with various embodiments in a schematic view.

FIG. 16 illustrates a method 1600 in accordance with various embodiments in a schematic view.

In accordance with various embodiments, on the basis of the contour pattern 604 it can be recognized if an object 702 is arranged in the transport container 400, e.g. in the first transport region 322a. By way of example, the object 702 may conceal a part of the first support area element 402a (cf. FIG. 3 and FIG. 4), of the chassis 312 (cf. FIG. 3) and/or of the image background. The concealment and/or the area occupation of the concealment can be determined on the basis of the contour pattern 604.

If the object 702 is transparent, the colour information 1204 may have for example a deviation that is too small to satisfy the criterion.

Optionally, on the basis of the depth information 1206, it can be recognized and/or confirmed that the object 702 is arranged in the transport container 400, e.g. in the first transport region 322a. By way of example, the contour and topography recognition can be triggered simultaneously.

Figure 17:
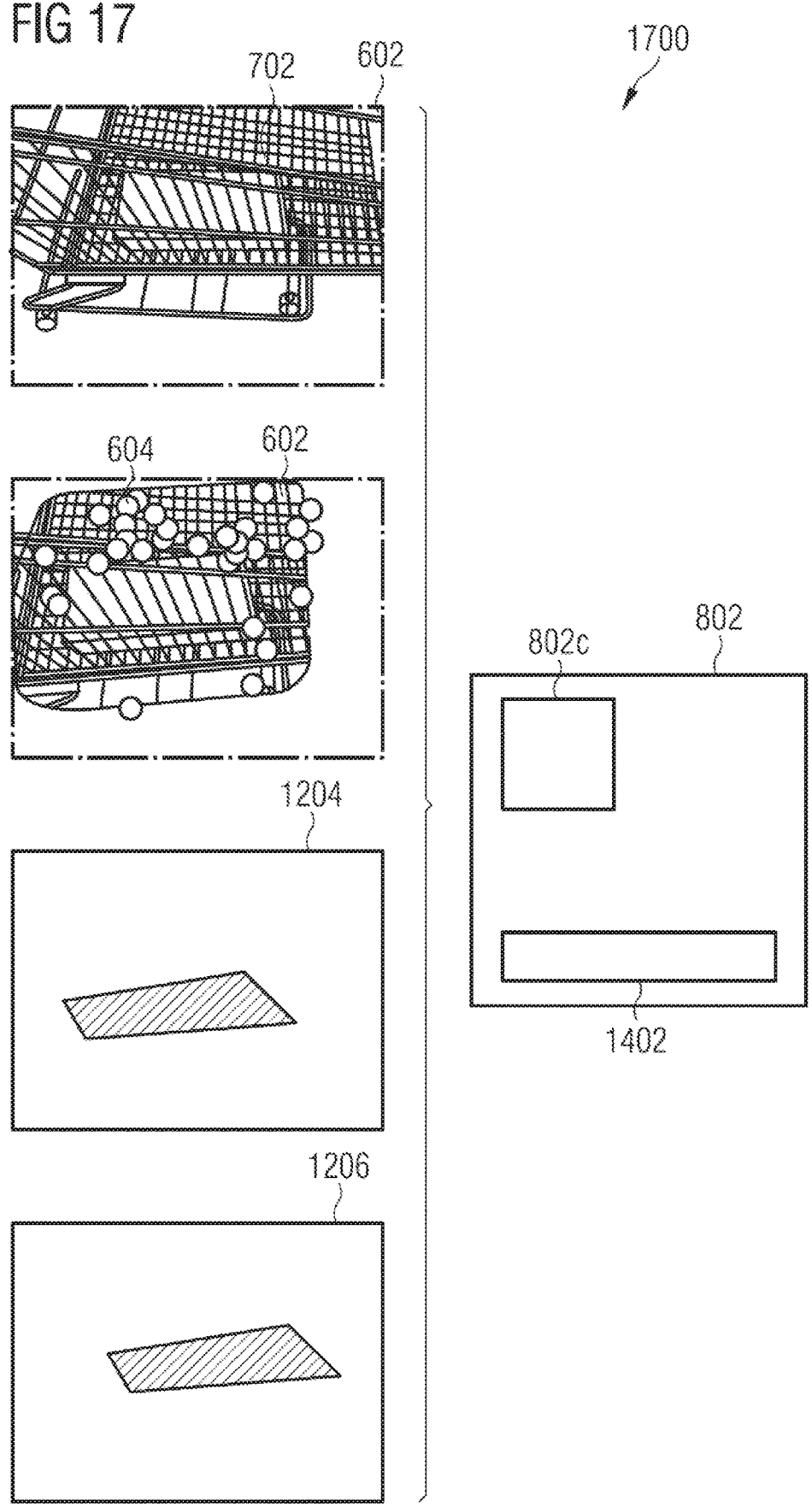
FIG. 17 shows a method in accordance with various embodiments in a schematic view.

FIG. 17 illustrates a method 1700 in accordance with various embodiments in a schematic view.

If an object 702 is arranged in a second region of the transport container 400 which is at least partly concealed e.g. by the first region 322a, a deviation brought about by the object 702 can be recognized on the basis of the contour pattern 604. By way of example, the object 702 may conceal a part of the second support area element 402b (cf. FIG. 3), of the chassis 312 and/or of the image background 602h.

Optionally, on the basis of the colour information 1204 and/or the depth information 1206, it can be recognized and/or confirmed that the object 702 is arranged in the transport container 400, e.g. in the second transport region 322b. By way of example, the contour recognition and simultaneously the colour recognition and/or the depth recognition can be triggered.

For recognizing the transport container 400 as empty, in accordance with various embodiments, it is possible to use a contour pattern 604 and optionally colour information 1204 and/or depth information 1206. A database may include reference image data and/or reference colour information and/or reference depth information representing an empty transport container 400. For recognizing the transport container 400 as empty, it is thus possible to dispense with an article database.

FIG. 18 illustrates a method 1800 in accordance with various embodiments in a schematic view.

In accordance with various embodiments, the image data can represent a first part 1802 of the first transport region 322a (may also be referred to as first partial region 1802).

In accordance with various embodiments, additional image data of an additional region of the transport container can be captured. The additional image data of the additional region can represent a second part 1804 of the first transport region 322a (may also be referred to as second partial region 1804). The image data and the additional image data can be captured in one go (e.g. simultaneously and/or by means of the same optical sensor), successively and/or by means of different optical sensors.

On the basis of the additional image data, an additional contour pattern 614 (second contour pattern 614) can be determined, which can be used as reference pattern 704. Illustratively, the second partial region 1804 can be used as a reference in order to determine whether an object is arranged in the first partial region 1802.

Alternatively or additionally, the additional image data of the additional region can represent the second transport region 322b. On the basis of the additional image data, another additional contour pattern 624 (third contour pattern 624) can be determined. The image data and the additional image data can be captured in one go (e.g. simultaneously and/or by means of the same optical sensor), successively and/or by means of different optical sensors. The deviation variable can then represent e.g. a disturbance 702u of the third contour pattern 624, which is brought about by the object 702.

In the case where the area elements which delimit a transport region 322a, 322b (e.g. in the case of a basket illustratively the basket inner areas if present, such as e.g. relatively large-area lattices), e.g. the support area element 402a, 402b (in the case of a basket illustratively a basket repository, e.g. with strut arrangements and/or a continuous insertion base), are arranged in the image capture region 208 (illustratively field of view of camera), the presence of an object 702 in the transport container 400, e.g. resting on the support area element 402a, 402b, can be determined. For this purpose, it is possible to determine a deviation, brought about by the visible surface of the object, from characteristic properties of a previously learned contour pattern 704 (i.e. the stored reference pattern 704) and/or of a currently determined contour pattern 614 (i.e. the additional contour pattern 614). The deviation can be represented by the deviation variable.

Illustratively, the deviation variable can be a measure of the absence 702u of the expected contour (e.g. lattice structure or lattice area) and/or of the disturbance 702u thereof in the examined region of the transport container 400, this being brought about by the object 702. By way of example, the expected contour pattern (e.g. lattice structure or lattice area) may be present in the second partial region 1804 (e.g. around the object 702) and/or in a different portion of the image data.

Alternatively or additionally, the deviation variable can be a measure of contrast transitions and/or contrast jumps, e.g. between adjacent regions and/or areas (e.g. between the support area element 402a, 402b and the object 702). This can be implemented on the basis of a learned (e.g. stored) reference pattern 704 and/or on the basis of two determined contour patterns 604, 614, 624, e.g. by means of establishing a relationship of the determined (e.g. continuous and/or adjacent) contour patterns 604, 614, 624 among one another or with the reference pattern 704.

Alternatively or additionally, it is possible to determine a contour pattern 1814 which represents the supporting surface 208u (for example tiled floor with joints, applied design elements such as advertising logos on the floor, through to cyclically learned contaminations, etc.). The deviation variable can then be a measure of the absence of the expected contour of the supporting surface 208u and/or of the disturbance 702u thereof, which are brought about by the object 702, e.g. in a manner deviating from the reference pattern 704 and/or a determined contour pattern 604, 614, 624 (illustratively expected contours/textures).

In accordance with various embodiments, it is possible to recognize objects that cannot be detected and/or are difficult to detect by means of 3D and/or colour recognition (e.g.

bottle crates with narrow bottles and thus a surface area which is too small for the 3D projection correspondence analysis, colourless objects and/or objects having little colour) in the second transport region 322*b* (illustratively below the basket on the lower repository) by using the method described herein (e.g. for the comparison between the examined area and the vicinity).

In accordance with various embodiments, a disturbance (may also be referred to as parasitic disturbance) which is not brought about by an object 702 (e.g. reflections on metal, discolourations of the transport container 400 owing to rust, deformations of the transport container 400, etc.) can be determined. The parasitic disturbance (may also be referred to as negative case) can thus be differentiated from the presence of an object 702 in the transport container 400 (may also be referred to as positive case). As a result, a false alarm can be avoided or reduced.

In accordance with various embodiments, colour information can optionally be provided by means of a colour recognition. By way of example, the deviation variable may include a deviation of the colour information of the image data from reference image data representing the transport container 400 and/or the image background 602*h* (e.g. the supporting surface 208*u*) in the case of an empty transport container 400. Illustratively, a contour difference recognition and colour difference recognition (deviating features with respect to the reference data set) can be carried out. The colour information of the supporting surface 208*u* in the image capture region 208 can be initially learned and stored in the database.

If an alteration relative to a reference colour spectrum was recognized in the analysis region, for example, this can be used as an indicator of the fact that the transport container 400 is not empty.

In accordance with various embodiments, it is possible to dynamically assess the deviation relative to the reference colour information in the colour space. A false alarm owing to an influence of ambient light can thus be reduced. In other words, it is possible to take account of an illumination state of the image capture region 208 for determining the deviation variable, e.g. on the basis of the additional contour pattern 614.

In accordance with various embodiments, 3D information (depth information) can optionally be provided by means of a depth recognition. The position of the region (e.g. an adjustable region between the supporting surface 208*u*, above the second support area element 402*b*, and the first support area element 402*a*) in which the depth information is intended to be determined can be initially learned (can be defined illustratively as the zone to be examined). By way of example, this can be carried out on the basis of the transport container type recognized. The position of the zone to be examined (e.g. the boundaries and/or threshold value thereof) can be stored in the database, e.g. assigned to the respective transport container type.

If a deviation of the depth information from reference depth information was recognized in the zone to be identified (may be e.g. the second transport region 322*b*), this can be used as an indicator that the transport container 400 is not empty.

In accordance with various embodiments, a combination variance can optionally be provided by means of a weight characteristic.

Illustratively, each deviation, represented by the deviation variable, from the different items of reference information can be used for recognizing the non-empty state (transport container 400 is not empty). Each active sensor can contribute to the recognition of the non-empty state. The data of the individual sensors can be weighted by means of the weight characteristic. It is thus possible to provide an intelligent (e.g. learnable) combination for increasing the quality of the evaluation. By way of example, the weight characteristic can be adapted if a false alarm was recognized. In that case, for example, on the basis of the cause of the error, the data (contour pattern, depth information and/or colour information) associated with the cause of the error can be given a lesser weighting. Alternatively or additionally, the weight characteristic can be dependent on the transport container type. The weight characteristic and/or the dependence thereof can be stored in the database.

In accordance with various embodiments, the method for the computer-aided recognition of the transport container 400 being empty and the device for the computer-aided recognition of the transport container 400 being empty can be retrofitted cost-effectively.

In accordance with various embodiments, complex learning of target objects (objects 702 to be recognized) can be dispensed with. In other words, an object database can be dispensed with. A transport container database can be used instead of that.

In accordance with various embodiments, simple (e.g. subsequent) mounting of an image capture sensor 202*s* on existing peripheral equipment, e.g. mounts of the elements of the checkout system (illustratively of the checkout furniture), can be provided.

In accordance with various embodiments, the image capture direction 208*b* can be directed at the supporting surface 208*u*. It is thus possible to reduce an encroachment on the private sphere of persons (e.g. customers), since the image capture sensor 202*s* is mounted at a non-critical viewing angle.

In accordance with various embodiments, capturing the additional image data and the image data can be carried out simultaneously. As an alternative or in addition to the additional contour pattern 614, the reference pattern 704 can be read out from a data storage medium.

The image data used can be provided with a sufficient large dimension, in order illustratively to provide the highest possible signal-to-noise ratio and/or a sufficient threshold value. The image data used can be provided with a sufficient small dimension in order illustratively to require as little computational complexity as possible.

Figure 19:
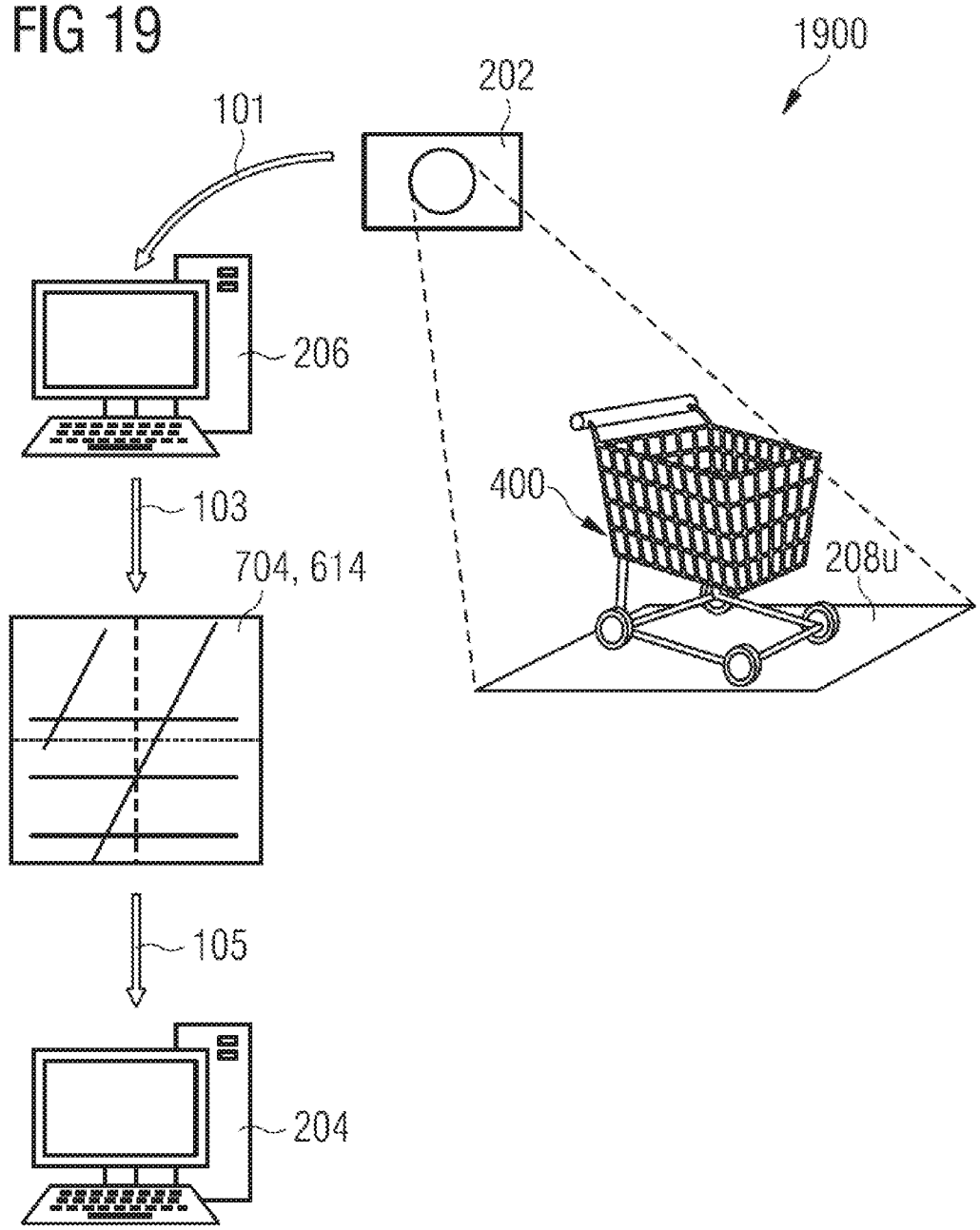
FIG. 19 shows a method in accordance with various embodiments in a schematic view.

FIG. 19 illustrates a method 1900 in accordance with various embodiments in a schematic view.

In accordance with various embodiments, it is possible firstly to carry out learning of the contour pattern 614 of the transport container 400 and/or (e.g. of feature-intensive regions) of the image background 602*h* (e.g. of the base structure of the supporting surface 602*h*, such as structure and/or texture), e.g. features, contours and/or patterns (e.g. by means of pattern recognition) of the contour pattern 614, and optionally of depth information and/or colour information of the transport container 400 and/or of the image background 602*h*. These data can be stored in a database (reference database).

For this purpose, image information of an empty transport container 400 can be captured by means of the image capture system 202 (e.g. before the supporting surface 208*u*). A reference pattern 704, 614 can be determined on the basis of the image information. The reference pattern 704, 614 can be stored by means of a data storage medium 204.

Figure 20:
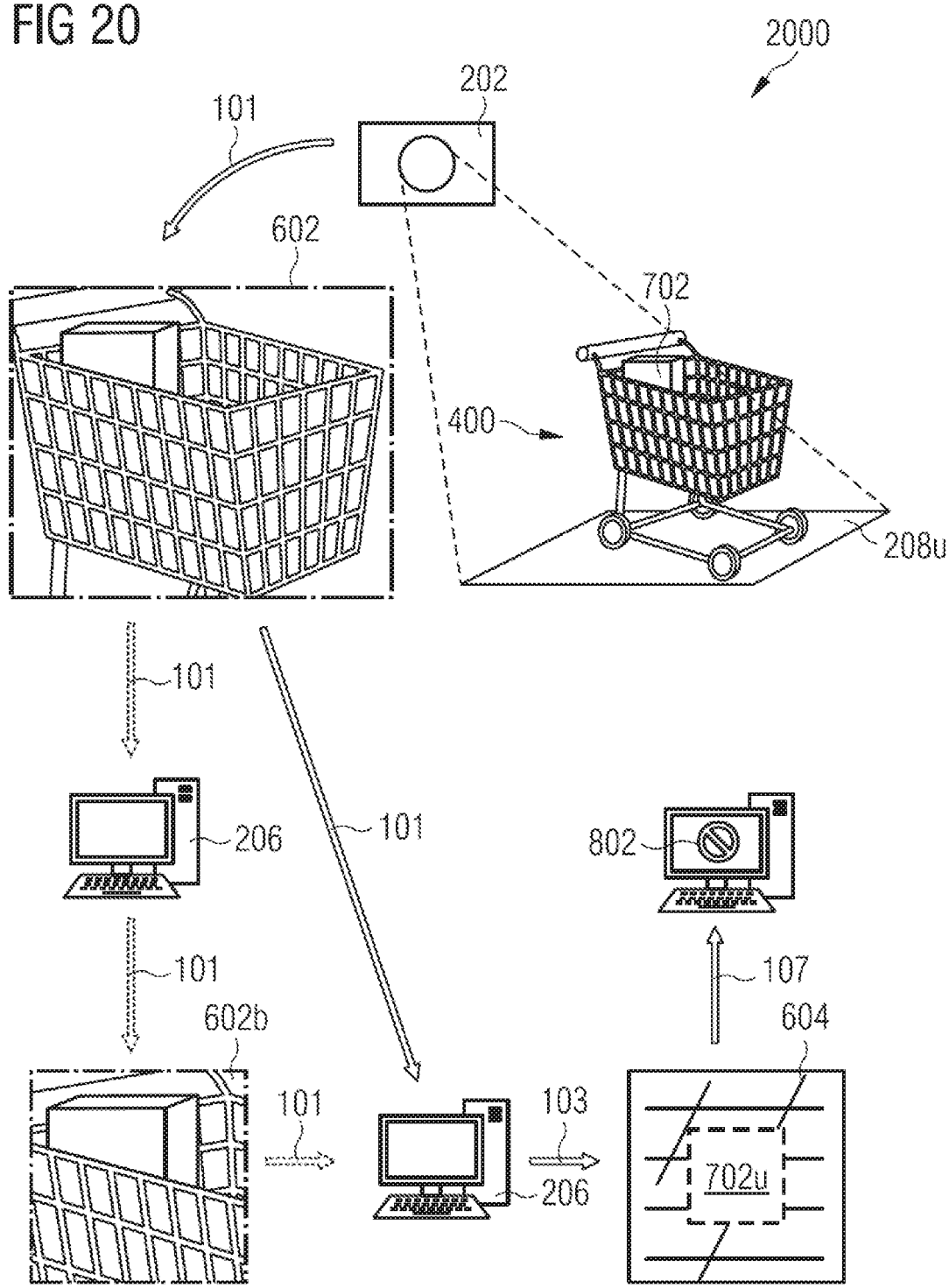
FIG. 20 shows a method in accordance with various embodiments in a schematic view.

FIG. 20 illustrates a method 2000 in accordance with various embodiments in a schematic view.

In accordance with various embodiments, recognizing the transport container 400 and/or the spatial location thereof in the image capture region 208 (position determination) can be carried out on the basis of the image data 602. Alternatively or additionally, recognizing the transport container 400 and/or the spatial location thereof in the image capture region 208 can be carried out using an acoustic sensor (e.g. using sound reflection), an optoelectronic sensor (e.g. a light barrier) and/or a radio tag sensor (e.g. RFID—identification with the aid of electromagnetic waves). By way of example, the transport container 400 may include a radio tag (may also be referred to as RFID transponder) and/or optical reflectors (optical markers).

In accordance with various embodiments, reflections, e.g. the distinctive form thereof, can be captured (in the form of reflection data), e.g. in the 2D image space. The reflections can be exerted, for example, by light being emitted with a defined wavelength range (e.g. IR, e.g. emitted by an IR protector) and/or at a defined angle into the image capture region 208. The reflections can be brought about by a metallic lattice structure of the transport container and/or of the optical reflectors. On the basis of a comparison of the captured reflection data (e.g. by means of a feature comparison) with the reference data, it is possible to determine whether a transport container is situated in the image capture region 208. This can lead to a considerably optimized reaction time.

Optionally, an analysis region 602b (ROI) can be determined on the basis of the spatial location. The analysis region 602b may illustratively denote that region of the image data which is processed in the further progression, e.g. by means of the processor 206.

In accordance with various embodiments, by means of the processor 206 it is possible to determine the state of the contour pattern 604, e.g. whether the contours of the lattice structure of the transport container 400 are complete or are interrupted or concealed by objects.

Optionally, on the basis of the image data 602 or the analysis region 602b, it is possible to determine a colour deviation and/or texture deviation, brought about by an object 702 in the transport container 400 (illustratively by articles present in the basket or in the lower region of the transport medium), relative to the reference pattern 704, representing e.g. the supporting surface 208u situated below the transport container 400 and/or other parts of the transport container 400.

Optionally, deviation data can be combined with the data of the acoustic sensor, of the optoelectronic sensor and/or of the radio tag sensor. A tendency towards a false alarm can thus be reduced (illustratively an optimization of the decision certainty).

Optionally, depth information can be determined on the basis of the image data 602 or the analysis region 602b. By way of example, the analysis region 602b can be adapted on the basis of the depth information, e.g. such that it overlaps the second transport region 322b.

In accordance with various embodiments, a signal representing a result of the recognition as empty can be output, e.g. to the operating personnel and/or by means of a screen 802.

In accordance with various embodiments, it is possible to carry out a combinatorial processing for recognition of the transport container 400 being empty, said processing including the following:

it is possible to recognize whether a determined contour pattern that represents a transport container 400 to be analyzed has a disturbance 702u brought about by an object 702 in the transport container 400. In other words, it is possible to determine a deviation from a contour pattern known to the system (said contour pattern representing e.g. an exposed lattice structure).

optionally, it is possible to carry out a colour difference analysis relative to the reference image data, e.g. relative to image background colour and feature information, e.g. with restriction to the analysis region 602b.

optionally, it is possible to recognize whether an object 702 is arranged in an (e.g. scalable and/or adjustable) analysis region 602b, which object brings about an at least partly concealed region of the transport container 400;

it is possible to recognize whether the transport container 400 has the state of empty (empty state);

a signal (indication signal) can be output (e.g. generated) if a different state from the empty state (e.g. if an object 702 is arranged in the transport container 400) and/or no transport container 400 were/was recognized;

optionally, learning and/or masking out of temporally variable objects (having e.g. a changing surface, such as e.g. advertising material holders) can be carried out in order to provide reliable recognition of the transport container 400 being empty (e.g. even though the contour pattern thereof deviates from the reference pattern). The learning may include determining a contour pattern which represents the variable object, and updating a reference pattern and/or the database to take account of the variable object.

FIG. 21 illustrates a method 2100 in accordance with various embodiments in a schematic flow diagram.

Optionally, the method 2100 may include in 2101 (may also be referred to as initial phase 2101): initiating an image capture system.

Furthermore, the method 2100 may include in 2103 (may also be referred to as transport container search phase 2103): searching for a transport container in an image capture region of the image capture system.

Furthermore, the method 2100 may include in 2105 (may also be referred to as recognition-as-empty phase 2105 or detection phase 2105 or article detection phase 2105): recognizing whether the transport container is empty. In accordance with various embodiments, the recognition-as-empty phase 2105 may include: determining a deviation variable; and determining whether the deviation variable satisfies a predefined criterion.

Furthermore, the method 2100 may include in 2107 (may also be referred to as evaluation phase 2107): determining whether recognition as empty was successful.

Furthermore, the method 2100 may include in 2109 (may also be referred to as signal output phase 2109): outputting a signal which represents a result of the recognition as empty.

FIG. 22 illustrates an initial phase 2101 in accordance with various embodiments in a schematic flow diagram.

The initial phase 2101 may optionally include in 2201 (may also be referred to as program start 2101): starting a program that is configured to carry out a method in accordance with various embodiments. By way of example, a processor can be put into a state ready for operation. The processor can be configured to carry out the method in accordance with various embodiments, e.g. by virtue of said processor executing the program.

Furthermore, the initial phase 2101 may include in 2203 (may also be referred to as camera initialization 2203): initiating an image capture system, e.g. one image capture sensor or a plurality of image capture sensors of the image capture system. By way of example, the image capture system (e.g. the one image capture sensor or the plurality of image capture sensors) can be put into a state ready for operation. Alternatively or additionally, at least one further (e.g. non-optical) sensor can be initiated, e.g. at least one acoustic sensor, at least one optoelectronic sensor and/or at least one radio tag sensor.

Furthermore, the initial phase 2101 may include in 2205: providing (e.g. loading and/or creating) one reference pattern or a plurality of reference patterns. The reference pattern can be loaded (i.e. called up) for example from a reference database.

Furthermore, the initial phase 2101 may include in 2207: providing (e.g. loading and/or creating) reference data. The reference data may include or be formed from one or a plurality of reference patterns, reference topography information, reference colour information and/or reference depth information. The reference data can be generated for the sensors.

FIG. 23 illustrates a transport container search phase 2103 in accordance with various embodiments in a schematic flow diagram.

The transport container search phase 2103 may include in 2301: providing (e.g. loading and/or creating) image data (may also be referred to as camera frame). The image data can represent an individual image. The image data can be captured for loading purposes.

Furthermore, the transport container search phase 2103 may include in 2303 (may also be referred to as recognition 2303 of the image capture region being empty): recognizing whether a transport container is arranged in the image capture region. Capturing 3D data (e.g. topography data and/or depth information) in the image capture region can be carried out for the purpose of recognizing the transport container in the image capture region. By way of example, for this purpose, an optical pattern can be emitted (e.g. projected) into the image capture region and image data of the image capture region which represent the optical pattern can be captured. Capturing the 3D data (e.g. topography data and/or depth information) can be carried out on the basis of the optical pattern (may then also be referred to as IR search phase 2303). Illustratively, the optical pattern can be influenced by a transport container in the image capture region. Illustratively, for capturing the 3D data, it is possible to capture an alteration of the optical pattern that is brought about by the transport container if the latter is arranged in the image capture region. At least one image capture sensor of the image capture system can be configured to capture the spectral range of the optical pattern.

Furthermore, the transport container search phase 2103 may include in 2305: deciding whether a transport container was recognized in the image capture region. If no transport container was recognized in the image capture region 2305*b* (decision=no 2305*b*), it is possible to continue with 2301 by providing further image data. If a transport container was recognized in the image capture region 2305*a* (decision=yes 2305*a*), it is possible to continue with 2307. Deciding whether a transport container was recognized in the image capture region can be carried out for example on the basis of the 3D data. By way of example, the 3D data can represent whether and/or to what extent the optical pattern is altered if the transport container is arranged in the image capture region. Illustratively, the transport container search phase 2103 can form a loop in which image data are captured until it has been recognized that a transport container is introduced into the image capture region and/or is already arranged therein.

For the purpose of deciding whether a transport container was recognized in the image capture region, determining a 3D deviation variable representing a deviation of the 3D data from reference 3D data can be carried out, wherein the reference 3D data represent an empty image capture region. Illustratively, the 3D data can be compared with the reference 3D data. If the deviation satisfies a predefined criterion, it can be decided that a transport container was recognized in the image capture region (decision=yes 2305*a*). If the deviation does not satisfy the predefined criterion, it can be decided that no transport container was recognized in the image capture region (decision=no 2305*b*).

The transport container search phase 2103 may optionally include in 2307: forming a multiplicity of image data using further image data (may also be referred to as further camera frame). The further image data can represent at least one further individual image. The multiplicity of image data can illustratively represent an image sequence (e.g. in a temporal and/or spatial sequence). For the purpose of forming the multiplicity of image data, the further image data can be captured after it has been recognized that a transport container is introduced into the image capture region and/or is arranged in the image capture region. Illustratively, it is thus possible to capture a large number of image data that represent the transport container for example in different locations.

If a multiplicity of image data are present, the transport container search phase 2103 may include in 2309: selecting the image data which represent the transport container and/or which have a predefined contour density. By way of example, for this purpose, the image data which represent the transport container and/or which have a predefined contour density can be determined (illustratively selected) from the multiplicity of image data. For the purpose of selecting the image data, already processed image data of the multiplicity of image data can be discarded (i.e. not taken into account).

Furthermore, the transport container search phase 2103 may include in 2311: recognizing the transport container using a contour pattern. Determining a contour pattern, which represents the transport container, using the image data can be carried out for this purpose. In 2311, for example, the transport container type and/or a location (alignment and/or position in the image capture region) of the transport container can be recognized.

Furthermore, the transport container search phase 2103 may include in 2313: deciding whether the transport container was recognized.

Figure 24:
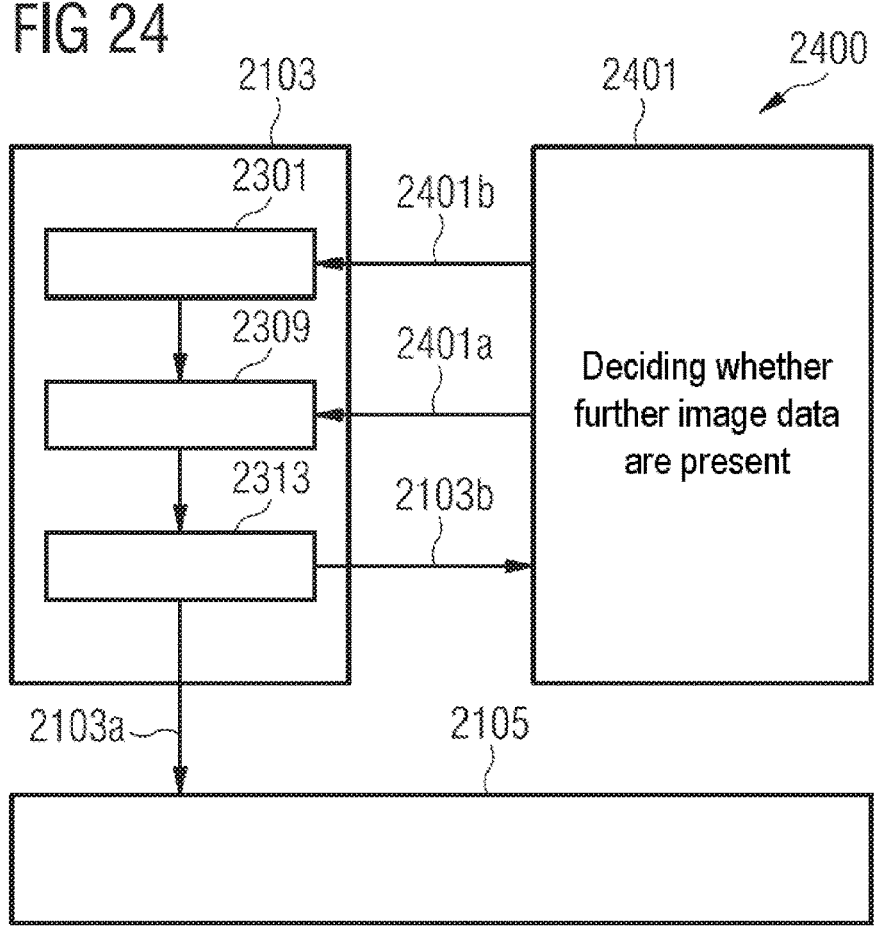

FIG. 24 illustrates a method 2400 in accordance with various embodiments in a schematic flow diagram.

The method 2400 may include the transport container search phase 2103 and the recognition-as-empty phase 2105.

Furthermore, the method 2400 may include in 2401: deciding whether further image data are present.

If it was decided 2313 that a transport container was recognized in the image capture region 2103*a* (decision=yes 2103*a*), it is possible to continue with the recognition-as-empty phase 2105.

If it was decided 2313 that no transport container was recognized 2103*b* (decision=no 2103*b*), deciding 2401 whether further image data are present (which have e.g. not yet been analyzed) can be carried out.

If it was decided 2401 that further image data are present 2401*a* (decision=yes 2401*a*), selecting other image data from the multiplicity of image data can be carried out in 2309. If it was decided 2401 that no further image data are present 2401*b* (decision=no 2401*b*), it is possible to continue with the transport container search phase 2103; e.g. in 2301 other image data can be provided (e.g. captured and/or loaded).

Figure 25:
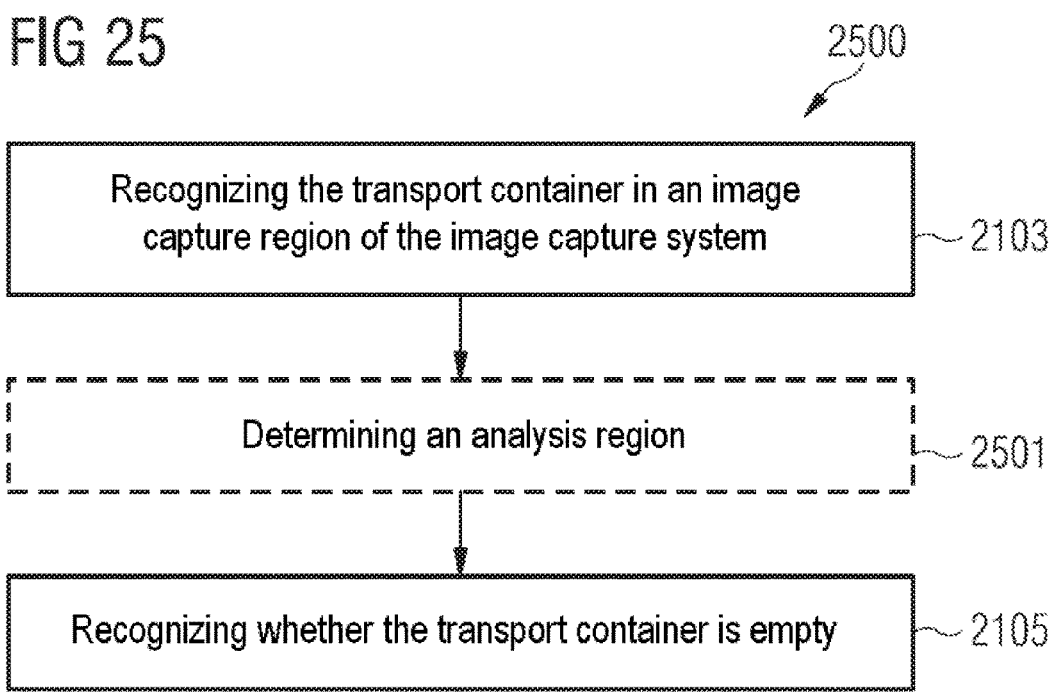

FIG. 25 illustrates a method 2500 in accordance with various embodiments in a schematic flow diagram.

The method 2500 may include the transport container search phase 2503 and the recognition-as-empty phase 2505.

Optionally, the method 2500 may include in 2501: determining an analysis region. Illustratively, from the image data it is possible to select a portion which is used in the recognition-as-empty phase 2105 (recognition of the transport container being empty). The outlay can thus be reduced.

Figure 26:
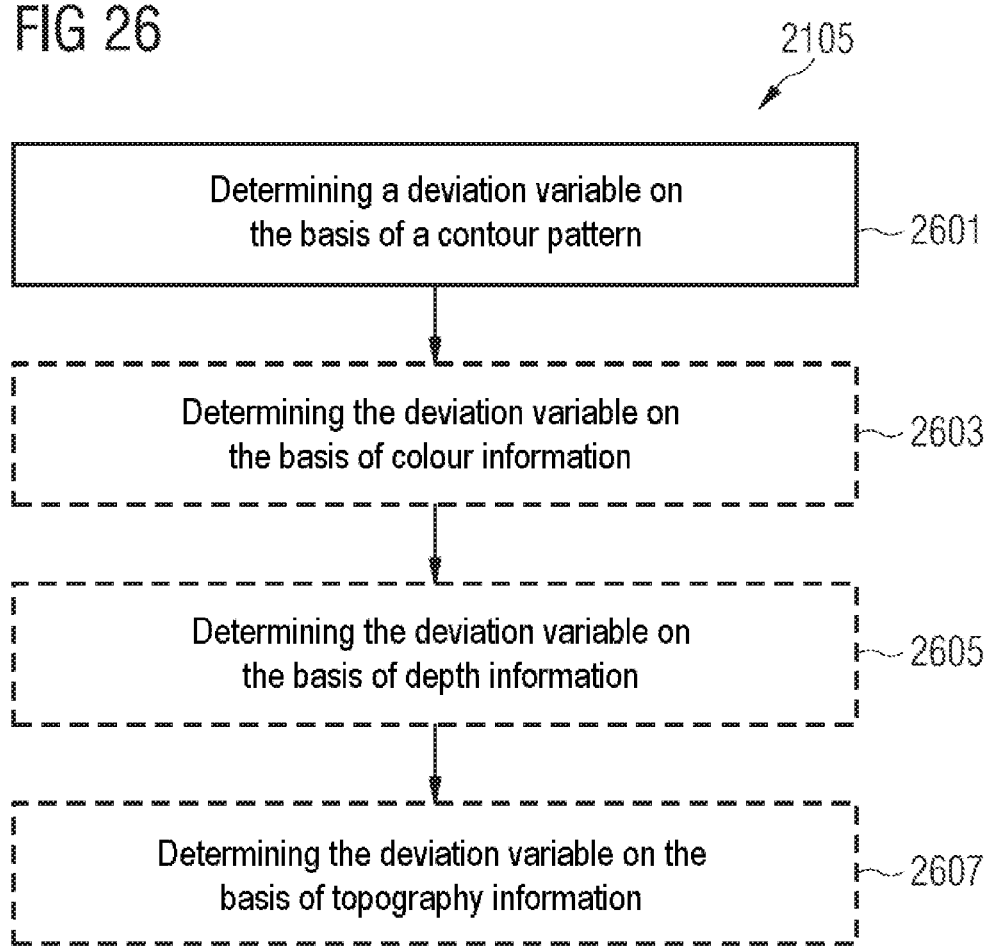

FIG. 26 illustrates a recognition-as-empty phase 2105 in accordance with various embodiments in a schematic flow diagram.

The recognition-as-empty phase 2105 may include in 2601: determining a deviation variable on the basis of a contour pattern. For this purpose, determining the contour pattern, which represents the transport container, using the image data (or the portion of the image data) can be carried out; and determining the deviation variable representing a deviation of the contour pattern from at least one reference pattern. The at least one reference pattern represents an empty transport container.

Optionally, the recognition-as-empty phase 2105 may include in 2603: determining the deviation variable on the basis of colour information. For this purpose, determining the colour information, which represents the transport container, using the image data (or the portion of the image data) can be carried out; and determining the deviation variable that represents a deviation of the colour information from reference colour information. The reference colour information represents an empty transport container.

Optionally, the recognition-as-empty phase 2105 may include in 2605: determining the deviation variable on the basis of depth information. For this purpose, determining the depth information, which represents the transport container, using the image data (or the portion of the image data) can be carried out; and determining the deviation variable that represents a deviation of the depth information from reference depth information. The reference depth information represents an empty transport container.

Optionally, the recognition-as-empty phase 2105 may include in 2607: determining the deviation variable on the basis of topography information. For this purpose, determining the topography information, which represents the transport container, using the image data (or the portion of the image data) can be carried out; and determining the deviation variable that represents a deviation of the topography information from reference topography information. The reference topography information represents an empty transport container. The topography information can be determined for example using the optical pattern.

The sequence illustrated in FIG. 26 can be carried out successively (may also be referred to as a single thread). By way of example, after each process of determining the deviation variable 2601, 2603, 2605, 2607, it is possible to determine whether an unambiguous decision (e.g. whether or not the transport container is empty) can be taken reliably (cf. recognition of error region). A reliability of the deviation variable can be determined for this purpose.

By way of example, the deviation variable can be refined (increased in terms of its reliability) by consulting further information (colour information, depth information and/or topography information) for determining the deviation variable. By way of example, a further process of determining the deviation variable 2603, 2605, 2607 can be carried out if it was determined that an unambiguous decision cannot be taken reliably. Illustratively, the data of the deviation variable can be successively superimposed step by step until a sufficient decision reliability is attained.

Figure 27:
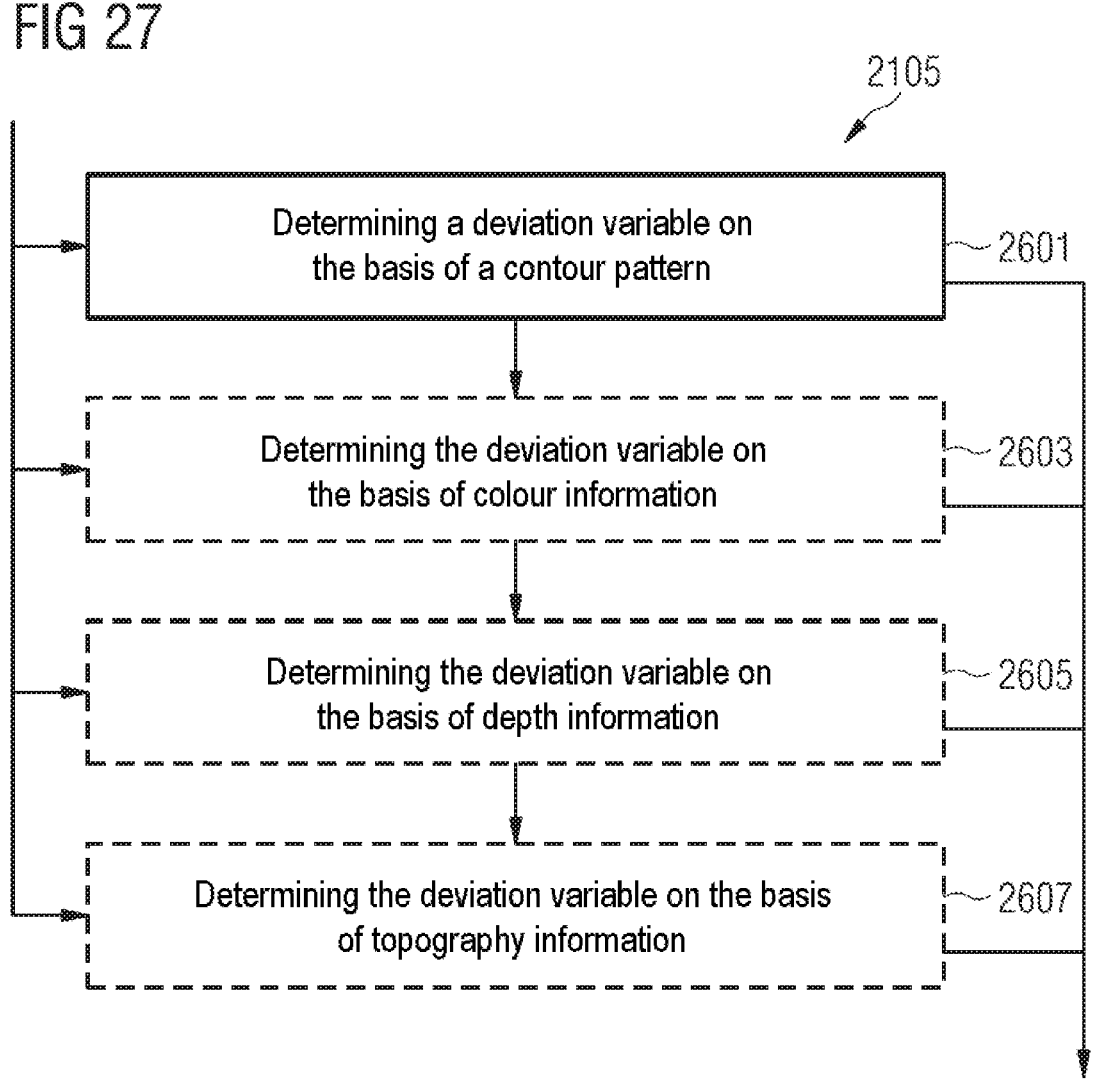

FIG. 27 illustrates a recognition-as-empty phase 2105 in accordance with various embodiments in a schematic flow diagram analogously to FIG. 26.

The sequence illustrated in FIG. 27 can be carried out at least partly in parallel with one another (may also be referred to as multithread). By way of example, at least two (e.g. three or four) items of information can be processed simultaneously for determining the deviation variable 2601, 2603, 2605, 2607.

Figure 28:
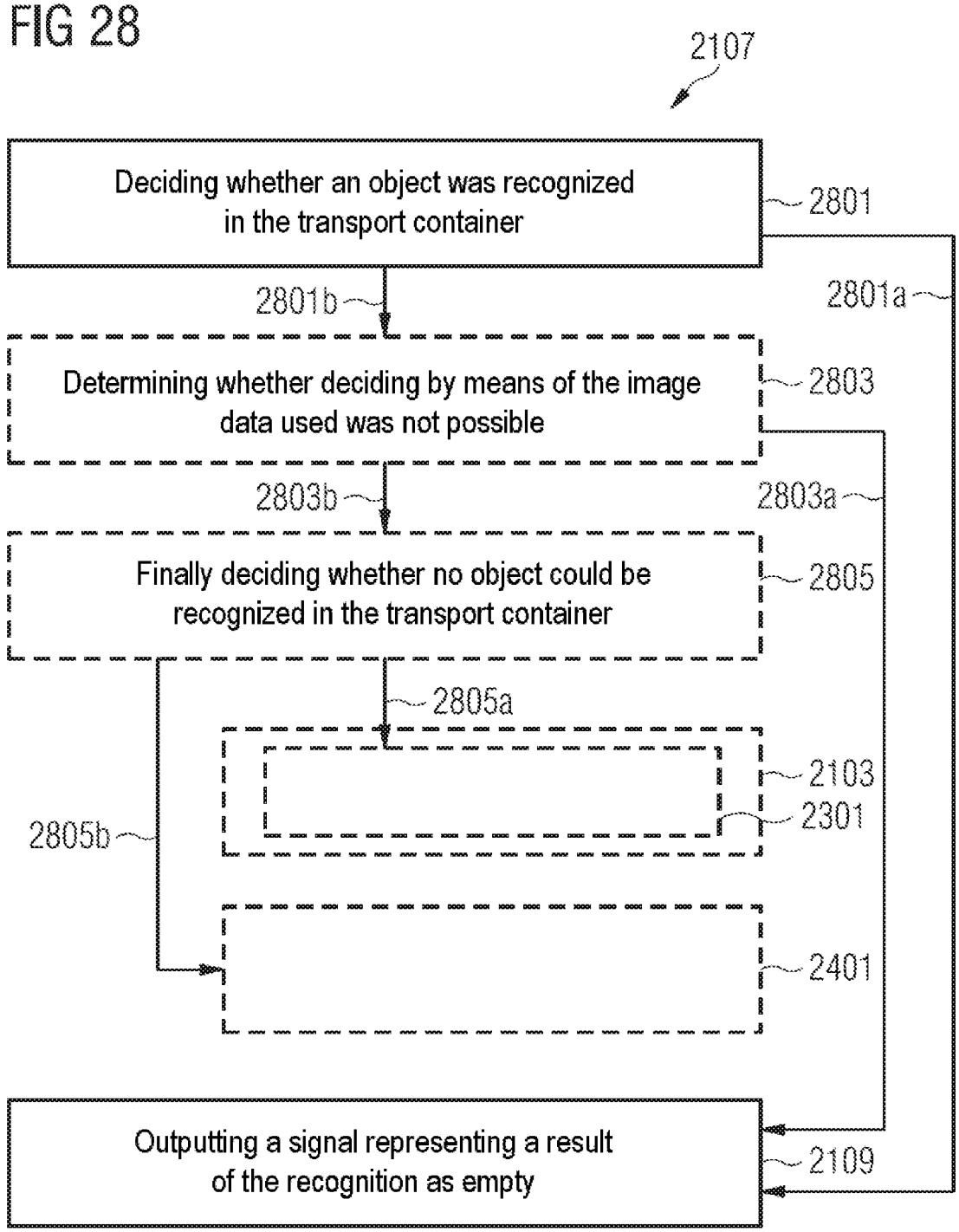

FIG. 28 illustrates an evaluation phase 2107 in accordance with various embodiments in a schematic flow diagram.

The evaluation phase 2107 may include in 2801: deciding whether an object (e.g. an article) was recognized in the transport container. If an object was recognized in the transport container 2801*a* (decision=yes 2801*a*), a corresponding signal can be output 2109 (e.g. a recognized-as-non-empty signal). If no object was recognized in the transport container 2801*b* (decision=no 2801*b*), a corresponding signal can optionally be output 2109 (e.g. a recognized-as-empty signal).

If no object was recognized in the transport container 2801*b* (decision=no 2801*b*), optionally in 2803 of the evaluation phase 2107 it is possible to carry out a process of determining whether deciding by means of the image data used was not possible, for example because the deviation variable was not reliable enough and/or because the image data were not sufficiently representative.

If it was determined that deciding on the basis of the image data used was not possible 2803*a* (decision=yes 2803*a*), a corresponding signal can be output 2109 (e.g. an error signal). If deciding by means of the image data used was possible 2803*b* (decision=no 2803*b*), in 2805 of the evaluation phase 2107 it is possible optionally to carry out a process of finally deciding whether no object (e.g. an article) was recognized in the transport container.

If it was finally decided that no object was recognized in the transport container 2805*a* (decision=yes 2805*a*), it is possible to start from the beginning with the transport container search phase 2103, e.g. it is possible to continue with 2301, e.g. by new image data of the transport container being provided. Illustratively, e.g. the loop 2301, 2303, 2305 can then be carried out until the next transport container has been recognized.

If it was not finally decided that no object was recognized in the transport container 2805*b* (decision=no 2805*b*), in 2401 it is possible to carry out a process of deciding whether further image data are present (which have e.g. not yet been analyzed). Illustratively, the decision that no object is arranged in the transport container can be checked using further image data of the multiplicity of image data.

In accordance with various embodiments, the process of finally deciding 2805 can be carried out if a predefined number of decisions on the basis of one and the same multiplicity of image data correspond. A risk of incorrect recognition can thus be reduced.

If further image data are present 2401*a* (decision=yes 2401*a*), selecting 2309 other image data from the multiplicity of image data can be carried out. If no further image data are present 2401*a* (decision=no 2401*b*), it is possible to start from the beginning with the transport container search phase 2103, e.g. it is possible to continue with 2301. In that case it is possible, for example, to capture new image data from the same transport container.

Figure 29:
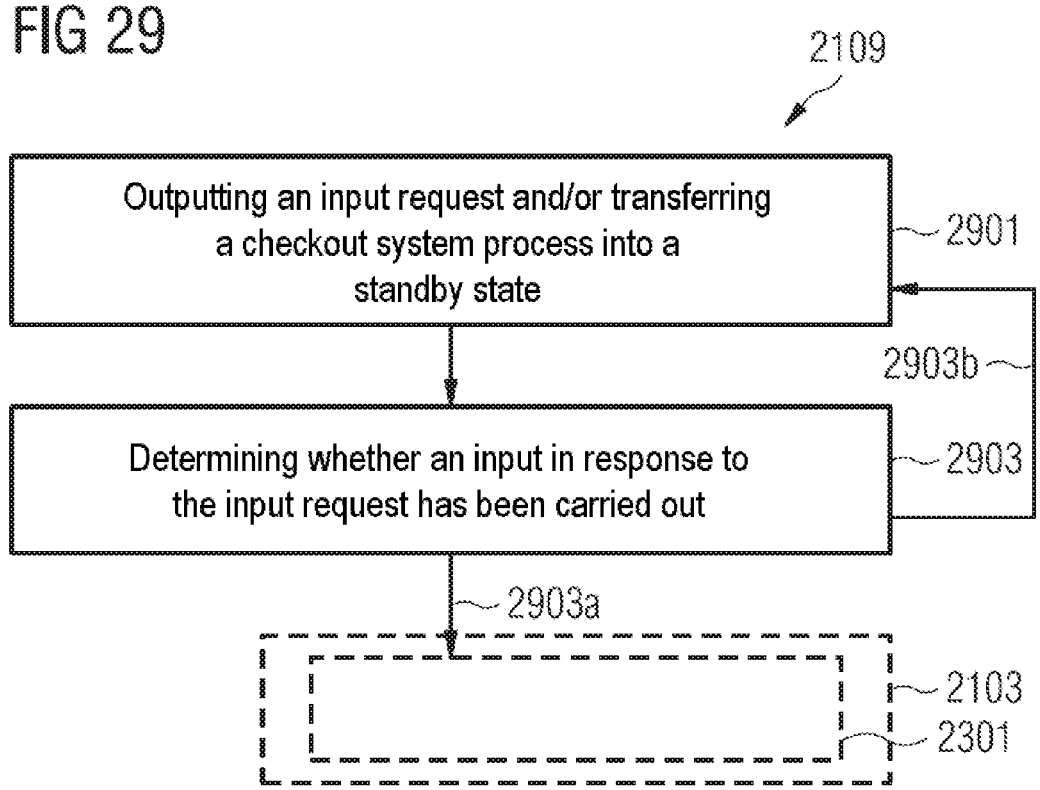

FIG. 29 illustrates a signal output phase 2109 in accordance with various embodiments in a schematic flow diagram.

The signal output phase 2109 may include in 2901: outputting an input request and/or transferring a checkout system process into a standby state (may also be referred to as program stop and/or waiting for user input). By way of example, the program can be stopped.

The signal output phase 2109 may include in 2903: determining whether an input in response to the input request has been carried out.

If an input in response to the input request has been carried out 2903a (decision=yes 2903a), it is possible to start from the beginning with the transport container search phase 2103, e.g. it is possible to continue with 2301. If an input in response to the input request has not been carried out 2903b (decision=no 2903b), the outputting of the input request and/or the standby state can be maintained.

Figure 30:
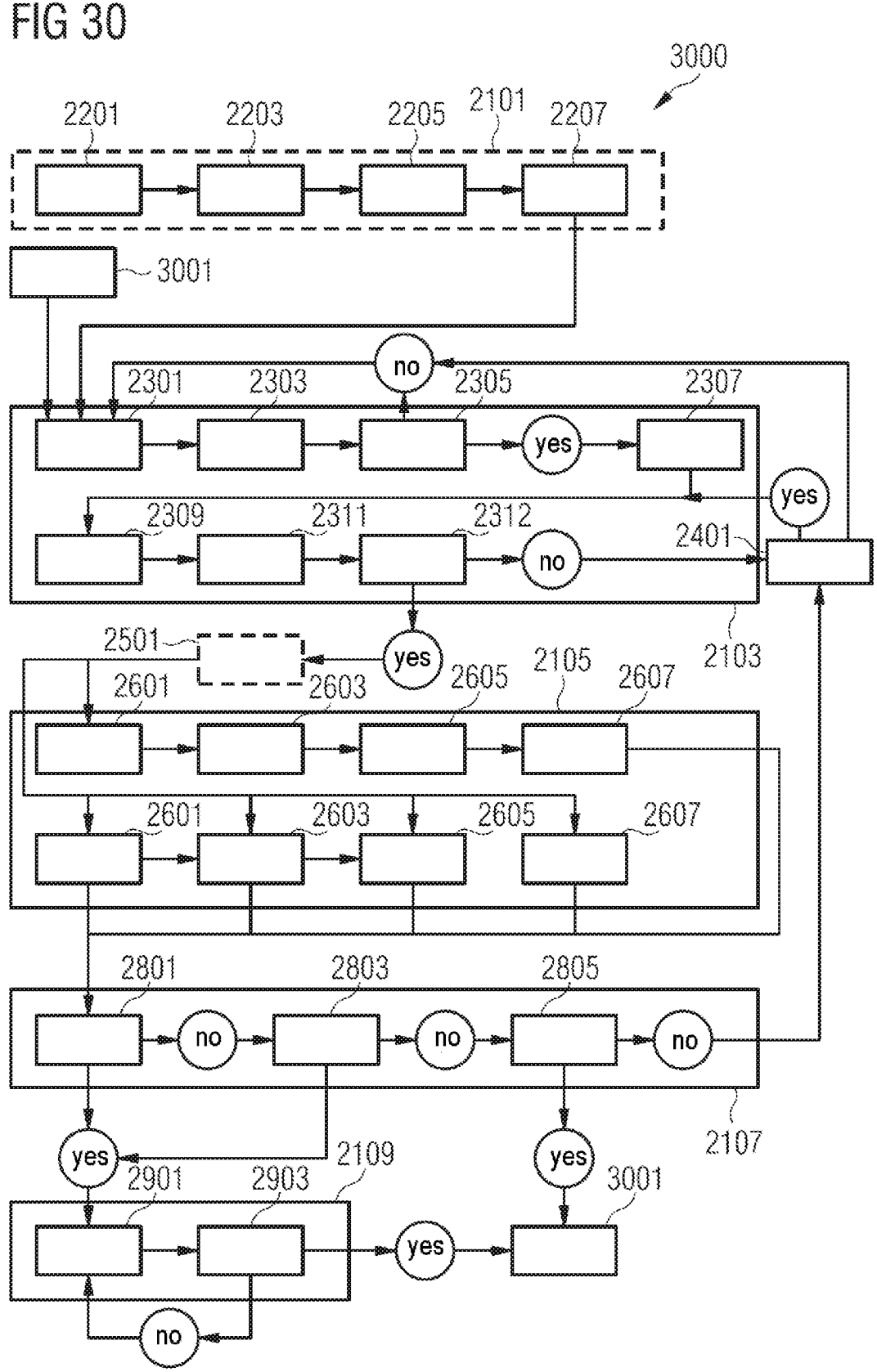

FIG. 30 illustrates a method 3000 in accordance with various embodiments in a schematic flow diagram, analogously to FIG. 21 to FIG. 29.

Figure 31:
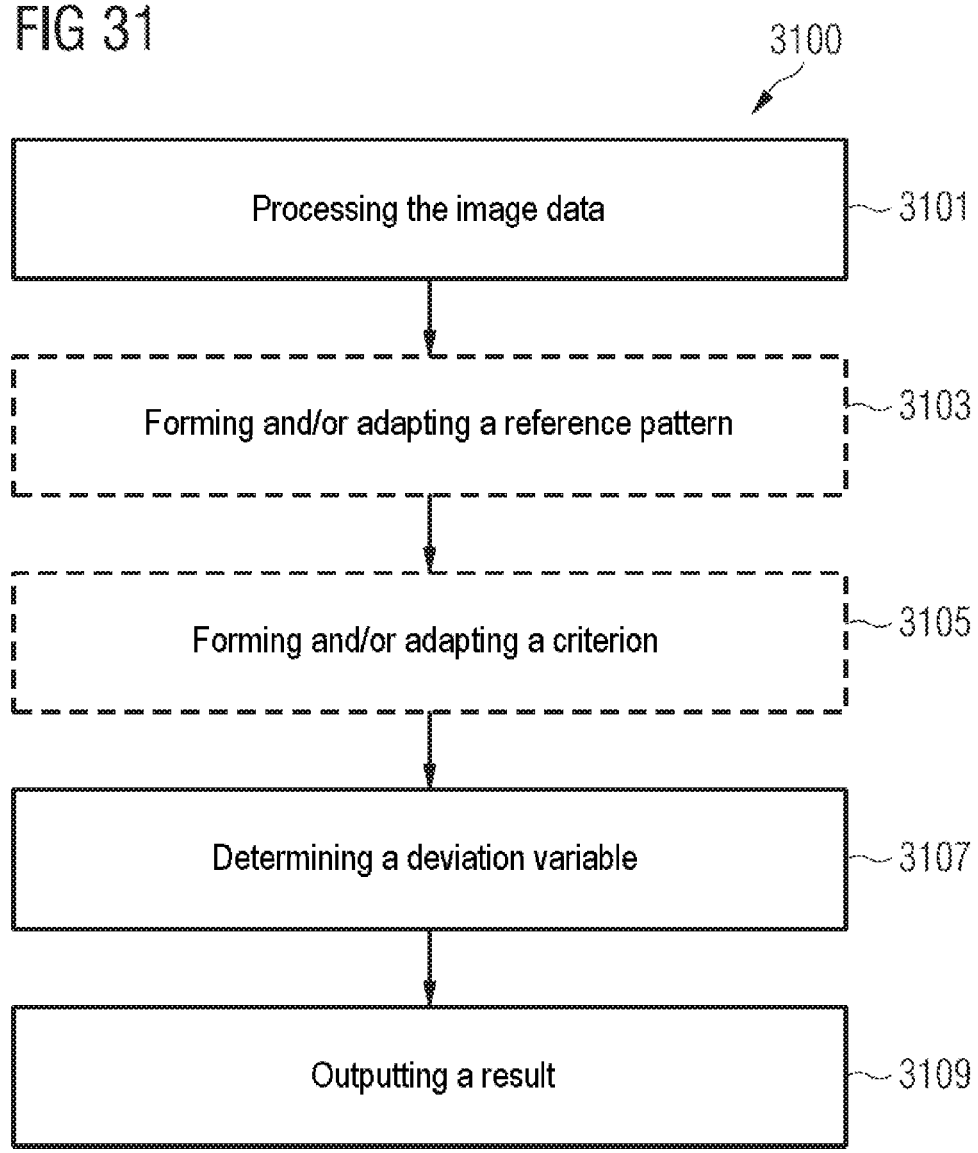

FIG. 31 illustrates a method 3100 in accordance with various embodiments in a schematic flow diagram.

The method 3100 may include in 3101: processing the image data (may also be referred to as process phase 3101).

The method 3100 may optionally include in 3103: forming and/or adapting a reference pattern (may also be referred to as reference pattern learning phase 3103), e.g. if no (e.g. appropriate) reference pattern is present and/or too few reference patterns are present.

The method 3100 may optionally include in 3105: forming and/or adapting a criterion (may also be referred to as criterion learning phase 3105).

The method 3100 may furthermore include in 3107: determining a deviation variable (may also be referred to as recognition phase 3107).

The method 3100 may furthermore include in 3109: outputting a result (may also be referred to as output phase 3109), e.g. outputting the deviation variable.

Figure 32:
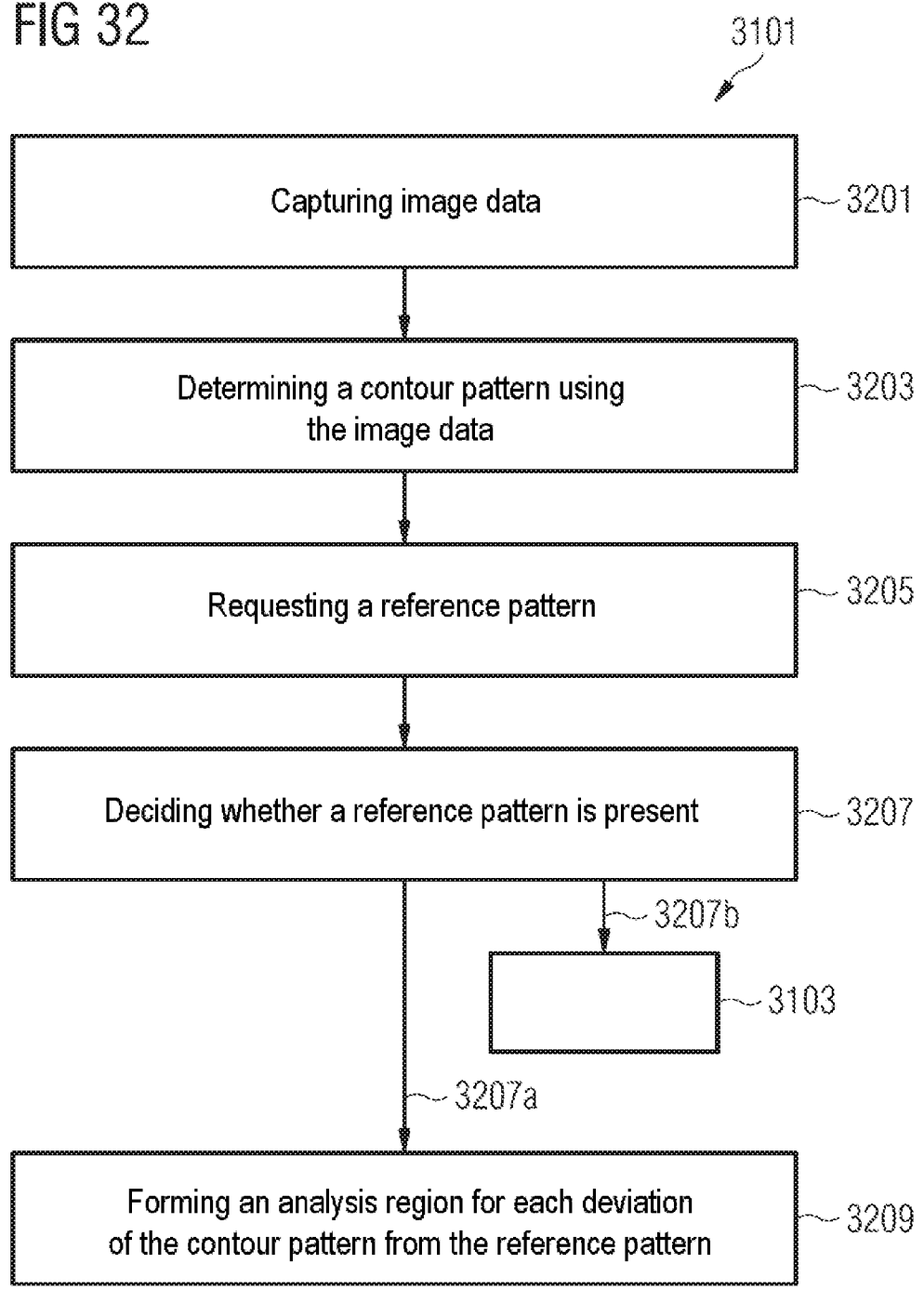

FIG. 32 illustrates a process phase 3101 in accordance with various embodiments in a schematic flow diagram.

The process phase 3101 may include in 3201: capturing image data.

The process phase 3101 may furthermore include in 3203: determining a contour pattern using the image data. By way of example, the contour pattern can be formed using a difference of Gaussian (DoG) algorithm. The difference of Gaussian algorithm may include forming a blurred version of the image data on the basis of the image data, and subtracting it from the image data. The blurred version can be formed using a Gaussian kernel, e.g. by convolving the image data using the Gaussian kernel. Alternatively or additionally, the blurred version can be formed using a soft-focus lens.

The process phase 3101 may furthermore include in 3205: requesting a reference pattern.

The process phase 3101 may furthermore include in 3207: deciding whether a reference pattern is present. If a reference pattern is present 3207a (decision=yes 3207a), it is possible to continue with 3209. If no reference pattern is present 3207b (decision=no 3207b), it is possible to continue with 3103, e.g. by forming a reference pattern.

The process phase 3101 may optionally include in 3209: forming an analysis region for each deviation of the contour pattern from the reference pattern. One or a plurality of deviations of the contour pattern from the reference pattern can be determined for this purpose.

Figure 33:
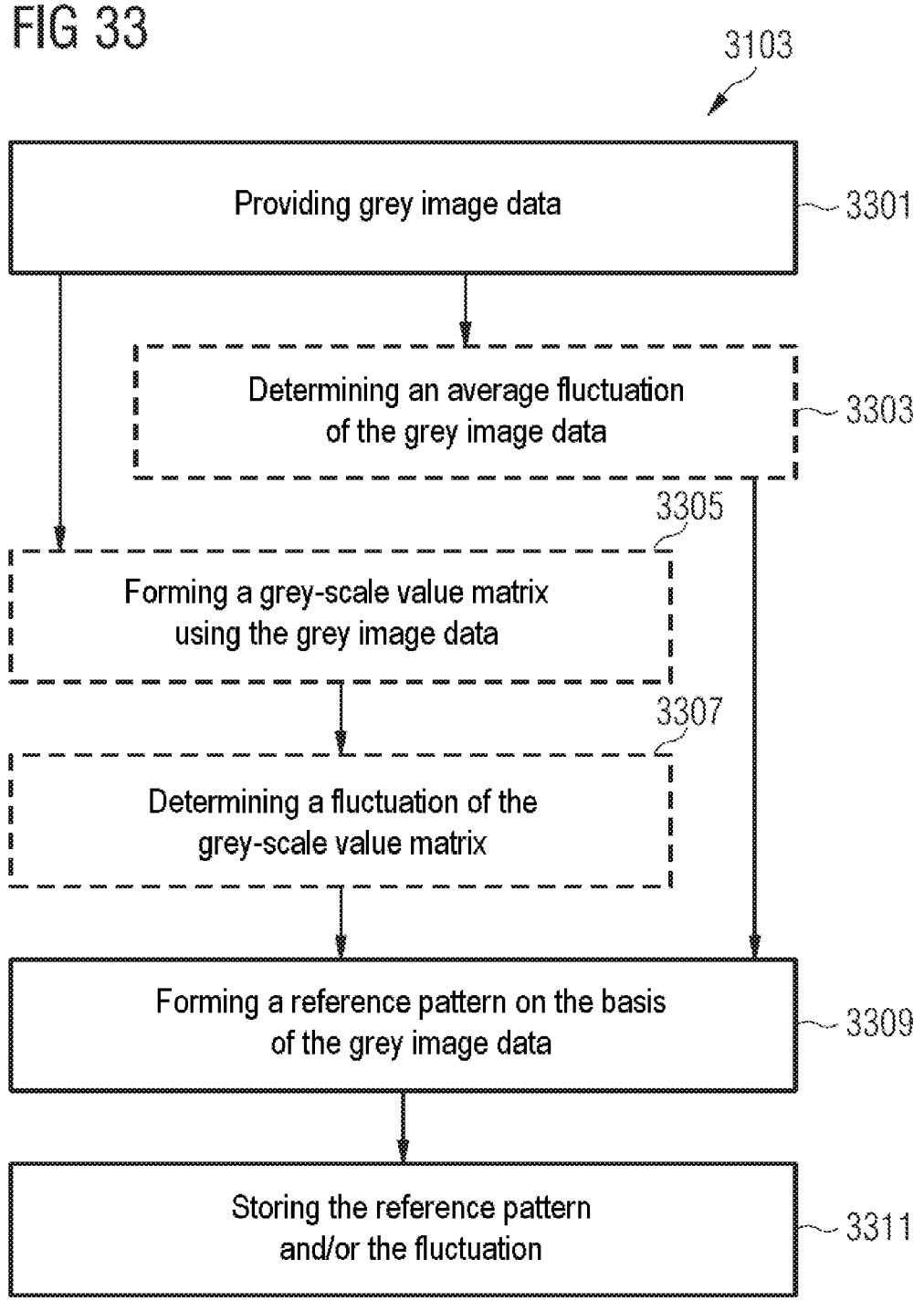

FIG. 33 illustrates a reference pattern learning phase 3103 in accordance with various embodiments in a schematic flow diagram.

The reference pattern learning phase 3103 may include in 3301: providing (e.g. forming) grey image data. For this purpose, the image data can be converted into grey shades (in so far as they are not already present in grey shades).

The reference pattern learning phase 3103 may optionally include in 3303: determining an average fluctuation of the grey image data. The average fluctuation can represent an average fluctuation of the grey-scale values of the grey image data. A mean value deviation and/or a standard deviation can be determined for the purpose of determining the average fluctuation.

The reference pattern learning phase 3103 may optionally include in 3305: forming a grey-scale value matrix using the grey image data.

The reference pattern learning phase 3103 may optionally include in 3307: determining a fluctuation of the grey-scale value matrix, e.g. an average fluctuation and/or a fluctuation of adjacent entries in the grey-scale value matrix. The fluctuation can represent a contrast, a homogeneity and/or an energy of the grey-scale value matrix.

The reference pattern learning phase 3103 may furthermore include in 3309: forming a reference pattern on the basis of the grey image data, e.g. using the fluctuation (in accordance with the grey-scale value matrix and/or in accordance with the grey image data).

The reference pattern learning phase 3103 may optionally include in 3311: storing the reference pattern and optionally the fluctuation, e.g. in a reference database. Alternatively or additionally, the reference pattern can be directly processed further.

Alternatively or additionally, the reference pattern learning phase 3103 can be carried out if it was finally decided that no object is arranged in the transport container, and/or if an input represents the fact that no object is arranged in the transport container.

Figure 34:
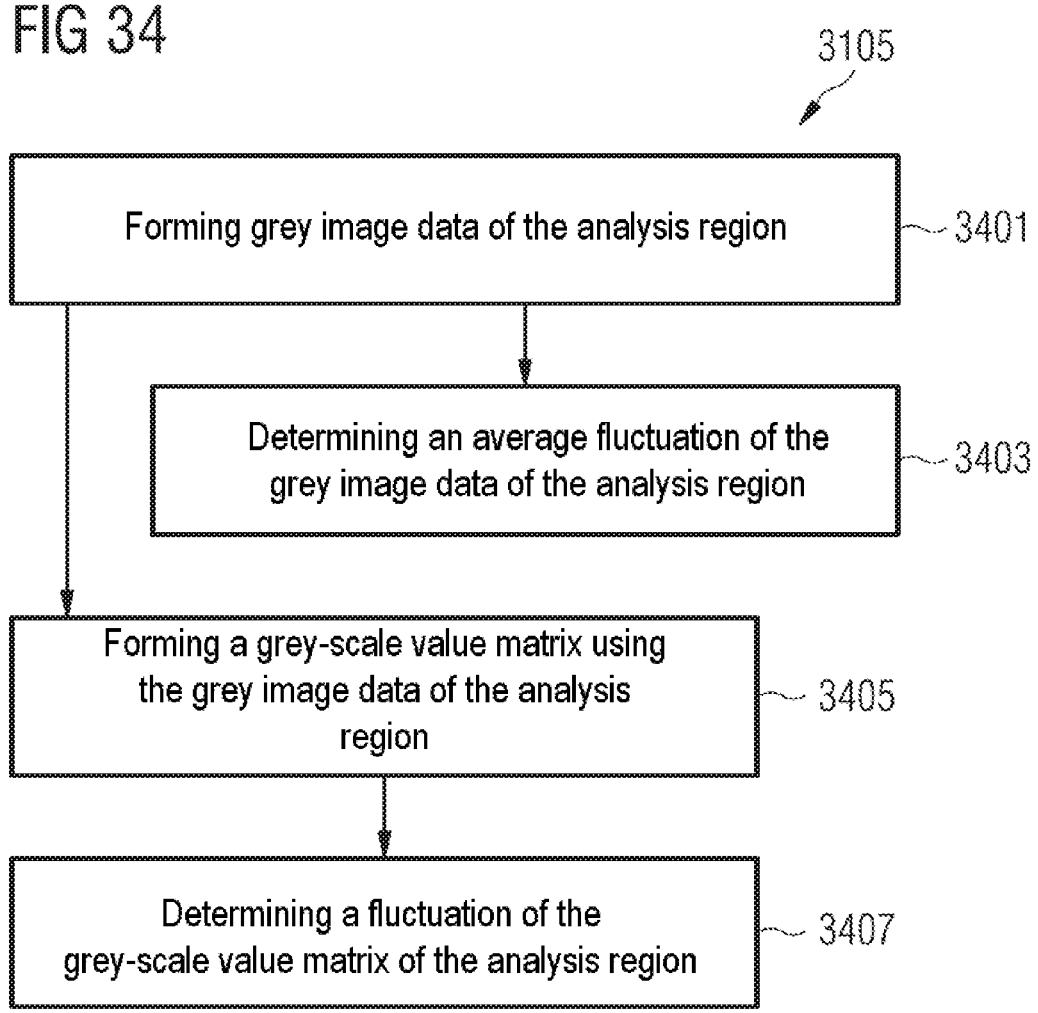

FIG. 34 illustrates a criterion learning phase 3105 in accordance with various embodiments in a schematic flow diagram.

The criterion learning phase 3105 may include in 3401: forming grey image data of the analysis region. For this purpose, the analysis region of the image data can be converted into grey shades (in so far as it is not already present in grey shades).

The criterion learning phase 3105 may furthermore include in 3403: determining an average fluctuation of the grey image data of the analysis region. The average fluctuation can represent an average fluctuation of the grey-scale values of the grey image data. A mean value deviation and/or a standard deviation can be determined for the purpose of determining the average fluctuation.

Alternatively or additionally, the criterion learning phase 3105 may include in 3405: forming a grey-scale value matrix using the grey image data of the analysis region. In that case, the criterion learning phase 3105 may include in 3407: determining a fluctuation of the grey-scale value matrix of the analysis region, e.g. an average fluctuation and/or a fluctuation of adjacent entries in the grey-scale value matrix. The fluctuation can represent a contrast, a homogeneity and/or an energy of the grey-scale value matrix.

Figure 35:
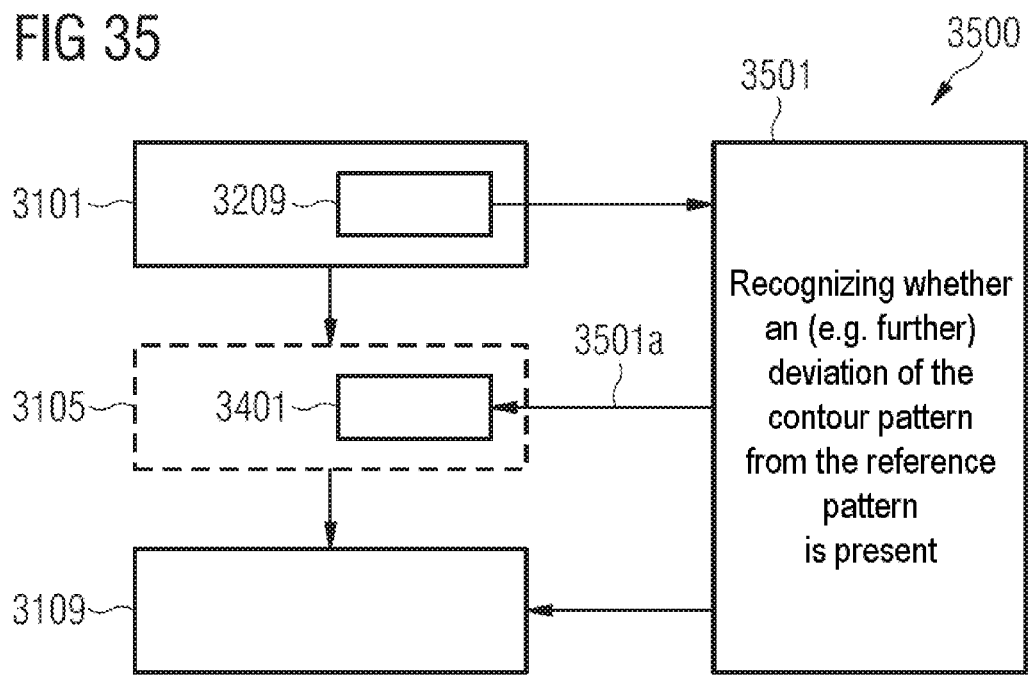

FIG. 35 illustrates a method 3500 in accordance with various embodiments in a schematic flow diagram.

The method 3500 may include the process phase 3101 and the output phase 3109. Optionally, the method 3500 may include the criterion learning phase 3105.

The method 3500 may furthermore include in 3501: recognizing whether a deviation of the contour pattern from the reference pattern is present, e.g. a further deviation if at least one deviation has already been recognized.

Recognizing whether a deviation of the contour pattern from the reference pattern is present can be carried out after the process phase 3101, e.g. after forming 3209 an analysis region for each deviation of the contour pattern from the reference pattern. Illustratively, an analysis region can thus be assigned iteratively to each deviation.

The result of whether a deviation of the contour pattern from the reference pattern is present can be output in 3109.

If a deviation of the contour pattern from the reference pattern was recognized 3605a (decision=yes 3605a), the criterion learning phase 3105 can optionally be carried out, e.g. continuing with forming 3401 grey image data of the analysis region.

Figure 36:
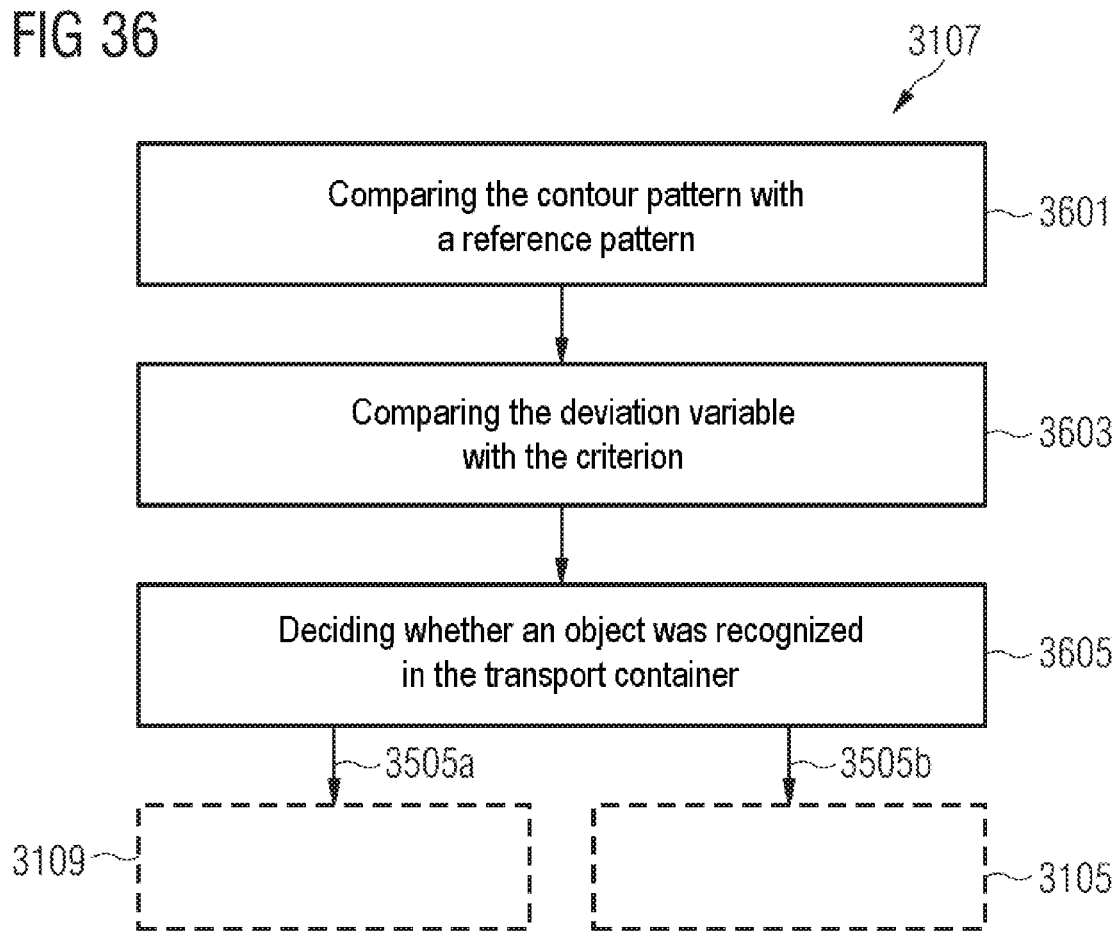

FIG. 36 illustrates a recognition phase 3107 in accordance with various embodiments in a schematic flow diagram.

The recognition phase 3107 may include in 3601: comparing the contour pattern with the reference pattern. For this purpose, the contour pattern can be compared with the reference database, e.g. in order to select the corresponding contour pattern. The deviation variable can be determined on the basis of the comparison.

The recognition phase 3107 may furthermore include in 3603: comparing the deviation variable with the criterion.

The recognition phase 3607 may furthermore include in 3603: deciding whether an object was recognized in the transport container. If the deviation variable accords with the criterion, it can be decided that an object has been recognized in the transport container. If the deviation variable does not accord with the criterion, it can be decided that no object has been recognized in the transport container.

If an object was recognized in the transport container 3605a (decision=yes 3605a), it is possible to continue with 3109, that is to say that the result that an object was recognized in the transport container can be output 3109. If no object was recognized in the transport container 3605b (decision=no 3605b), it is possible to continue with 3501. Illustratively, the next deviation and/or the next analysis region can then be processed.

If all of the deviations and/or of the analysis regions of the image data have been processed, it is possible to continue with 2401.

Figure 37:
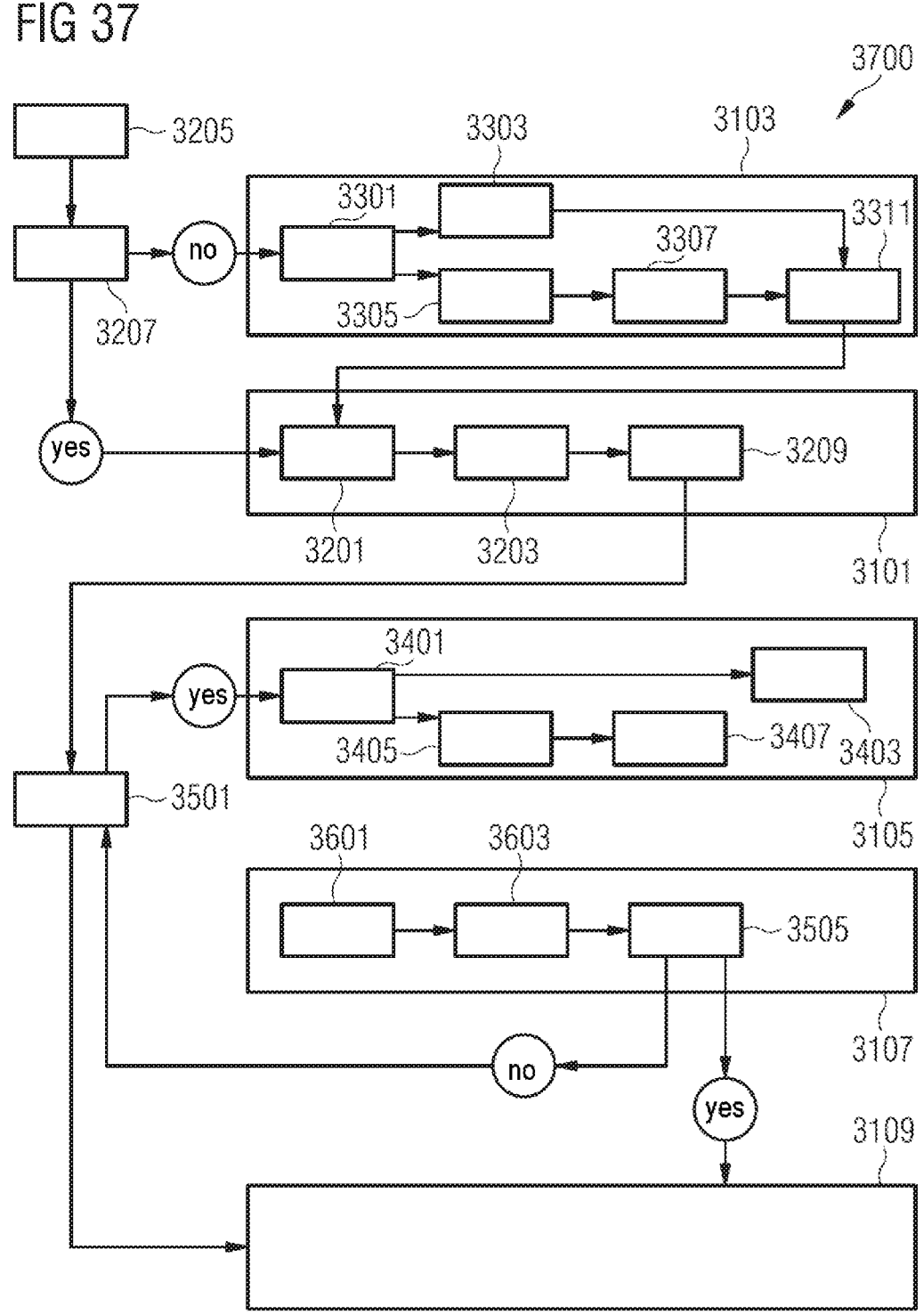

FIG. 37 illustrates a method 3700 in accordance with various embodiments in a schematic flow diagram, analogously to FIG. 31 to FIG. 36.

The result that is output 3109 can be processed further, e.g. for outputting the signal.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for computer-aided recognition of a transport container being empty, the method comprising:

arranging the transport carrier in an image capture region;

capturing a multiplicity of image data of the image capture region wherein said multiplicity of image data represents one of a temporal sequence and a spatial sequence of the transport container including a transport region of the transport container, wherein the image capture region defines an image background of the transport container;

determining respective contour patterns in each of the multiplicity of image data, wherein each respective contour pattern represents the transport container;

determining respective contour densities in each of the multiplicity of image data;

recognizing a type of the transport container based on the contour density in at least one image data of the multiplicity of image data;

discarding the multiplicity of image data other than the at least one image data recognized during said recognizing;

determining if the contour pattern in the at least one image data recognized during said recognizing includes a disturbance in the transport region of the transport container;

determining a deviation variable, which represents a deviation of the contour pattern in the at least one image data recognized during said recognizing caused by the disturbance from at least one reference pattern, wherein the at least one reference pattern represents an empty transport container while the transport carrier is in the image capture region and comprises a contour pattern representing the image background; and outputting a signal if the deviation variable satisfies a predefined criterion.

2. The method of claim 1, further comprising:

capturing image data of an additional region of the transport container;

determining an additional contour pattern, which represents the additional region, on the basis of the image data of the additional region of the transport container; and wherein the at least one reference pattern includes a reference pattern associated with the additional region of the transport container and comparable to the additional contour pattern.

3. The method of claim 1, wherein the predefined criterion represents an empty transport container and the signal comprises a recognized-as-empty signal.

4. The method of claim 1, wherein said outputting further comprises outputting an input request, and wherein a checkout system process transitions into a standby state until an input is carried out in response to the input request.

5. The method of claim 1, further comprising:

determining colour information on the basis of the image data;

wherein the deviation variable furthermore represents a deviation of the colour information from reference colour information, wherein the reference colour information represents an empty transport container.

6. The method of claim 1, further comprising:

determining topography information on the basis of the image data;

wherein the deviation variable furthermore represents a deviation of the topography information from reference topography information, wherein the reference topography information represents an empty transport container.

7. The method of claim 1, further comprising:
determining depth information on the basis of the image data;
wherein the deviation variable furthermore represents a deviation of the depth information from reference depth information, wherein the reference depth information represents an empty transport container.

8. The method of claim 7,
wherein determining the depth information comprises capturing image information of an additional region of the transport container through the region.

9. The method of claim 1,
wherein each of the respective contour patterns in each of the multiplicity of image data represents
a lattice structure of the transport container.

\* \* \* \* \*